US011900029B2

(12) United States Patent
Bandara et al.

(10) Patent No.: US 11,900,029 B2
(45) Date of Patent: *Feb. 13, 2024

(54) METHODS AND SYSTEMS FOR GENERATING LATTICE RECOMMENDATIONS IN COMPUTER-AIDED DESIGN APPLICATIONS

(71) Applicant: Autodesk, Inc., San Francisco, CA (US)

(72) Inventors: Konara Mudiyanselage Kosala Bandara, Beckenham (GB); Hooman Shayani, Longfield (GB)

(73) Assignee: Autodesk, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/128,770

(22) Filed: Mar. 30, 2023

(65) Prior Publication Data

US 2023/0237219 A1    Jul. 27, 2023

Related U.S. Application Data

(60) Division of application No. 17/188,432, filed on Mar. 1, 2021, now Pat. No. 11,704,456, which is a
(Continued)

(51) Int. Cl.
*G06F 30/20* (2020.01)
*G06T 17/00* (2006.01)
(Continued)

(52) U.S. Cl.
CPC .......... *G06F 30/20* (2020.01); *G06F 2111/10* (2020.01); *G06F 2119/18* (2020.01); *G06T 17/00* (2013.01); *Y02P 90/02* (2015.11)

(58) Field of Classification Search
None
See application file for complete search history.

(56) References Cited

U.S. PATENT DOCUMENTS 8,665,261 B1 *   3/2014   Baraff ..................... G06T 7/344
                                                    345/428
10,936,767 B2    3/2021   Bandara et al.
(Continued)

FOREIGN PATENT DOCUMENTS

WO   WO 2002/080045   10/2002
WO   WO 2012/031161   3/2012
(Continued)

OTHER PUBLICATIONS

Bethi, "Within Topology Editor Technical Manual for Version 1.0," Jun. 12, 2013, 16 pages.
(Continued)

*Primary Examiner* — Craig C Dorais
(74) *Attorney, Agent, or Firm* — Fish & Richardson P.C.

(57) ABSTRACT

Methods, systems, and apparatus, including medium-encoded computer program products, for designing three dimensional lattice structures include, in one aspect, a method including: obtaining a mechanical problem definition including a 3D model of an object; generating a numerical simulation model for the 3D model of the object using one or more loading cases and one or more isotropic solid materials identified as a baseline material model for a design space; predicting performance of different lattice settings in different orientations in the design space using a lattice structural behavior model in place of the baseline material model in the numerical simulation model; and presenting a set of lattice proposals for the design space based on the predicted performance of the different lattice settings in the different orientations; wherein the lattice
(Continued)

structural behavior model has been precomputed for the different lattice settings, which are generable by the 3D modeling program.

20 Claims, 15 Drawing Sheets

Related U.S. Application Data continuation of application No. 16/096,623, filed as application No. PCT/EP2017/059918 on Apr. 26, 2017, now Pat. No. 10,936,767.

(60) Provisional application No. 62/328,219, filed on Apr. 27, 2016.

(51) Int. Cl.
  *G06F 111/10* (2020.01)
  *G06F 119/18* (2020.01)

(56) References Cited

U.S. PATENT DOCUMENTS

| | | | |
|---|---|---|---|
| 11,704,456 | B2 | 7/2023 | Bandara et al. |
| 2012/0239359 | A1 | 9/2012 | Furuya et al. |
| 2014/0363481 | A1 | 12/2014 | Pasini et al. |
| 2015/0190971 | A1 | 7/2015 | Ravi et al. |
| 2017/0083003 | A1* | 3/2017 | Arisoy .................. G06F 30/00 |
| 2019/0138670 | A1 | 5/2019 | Bandara et al. |
| 2021/0182455 | A1 | 6/2021 | Bandara et al. |

FOREIGN PATENT DOCUMENTS

| | | |
|---|---|---|
| WO | WO 2016/000035 | 1/2016 |
| WO | WO 2018/054502 | 3/2018 |

OTHER PUBLICATIONS

Cignoni et al., "A Comparison of Mesh Simplification Algorithms," Computers & Graphics, 22(1):37-54, 1998.
EP Communication Pursuant to Article 94(3) in European Appln. No. 17720089.6, dated Jul. 13, 2021, 7 pages.
Heckbert and Garland, "Survey of Polygonal Surface Simplification Algorithms," Technical Report, Carnegie Mellon University, 1997, 32 pages.
International Search Report/Written Opinion; dated Jul. 26, 2017 by European Patent Office; 23 pgs.
Nguyen et al., "Conformal Lattice Structure Design and Fabrication", Solid Freeform Fabrication Symposium, Sep. 2012, pp. 138-161; 24 pgs.
Office Action in Chinese Appln. No. 201780034840.1, dated Sep. 22, 2022, 21 pages (with English translation).
Office Action in European Appln. No. 17720089.6, dated Nov. 14, 2022, 7 pages.
Ruto et al., "Within Enhance Technical Manual for Version 4.2," Mar. 31, 2014, 31 pages.
Ruto et al., "Within Enhance Technical Manual for Version 4.3," Jan. 15, 2015, 32 pages.
Ruto et al., "Within Enhance Technical Manual for Version 4.1," Jul. 5, 2013, 45 pages.
Ruto, "Within Lite Technical Manual for Version 4.2," Apr. 30, 2013, 18 pages.
Ruto, "Within Medical [Biomet Edition] Technical Manual for Version 4.2," Mar. 13, 2013, 27 pages.
Ruto, "Within Medical Technical Manual for Version 4.2," Mar. 15, 2013, 48 pages.
Ruto, "Within Variable Technical Manual for Version 4.2," Jun. 26, 2013, 20 pages.
Tang et al., "Lattice-skin Structures Design with Orientation Optimization", Solid Freeform Fabrication Symposium, Aug. 2015, pp. 1378-1393; 16 pgs.
Zienkiewicz, "The Finite Element Method," vol. 3., © 1977 McGraw-Hill Book Company (UK) Limited, 1977, 5 pages.

* cited by examiner

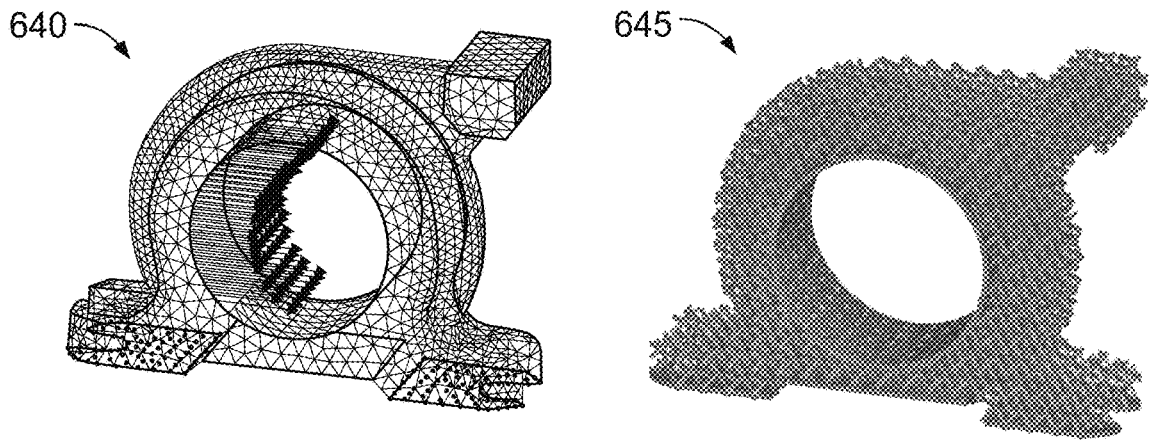
FIG. 6B
FIG. 6C
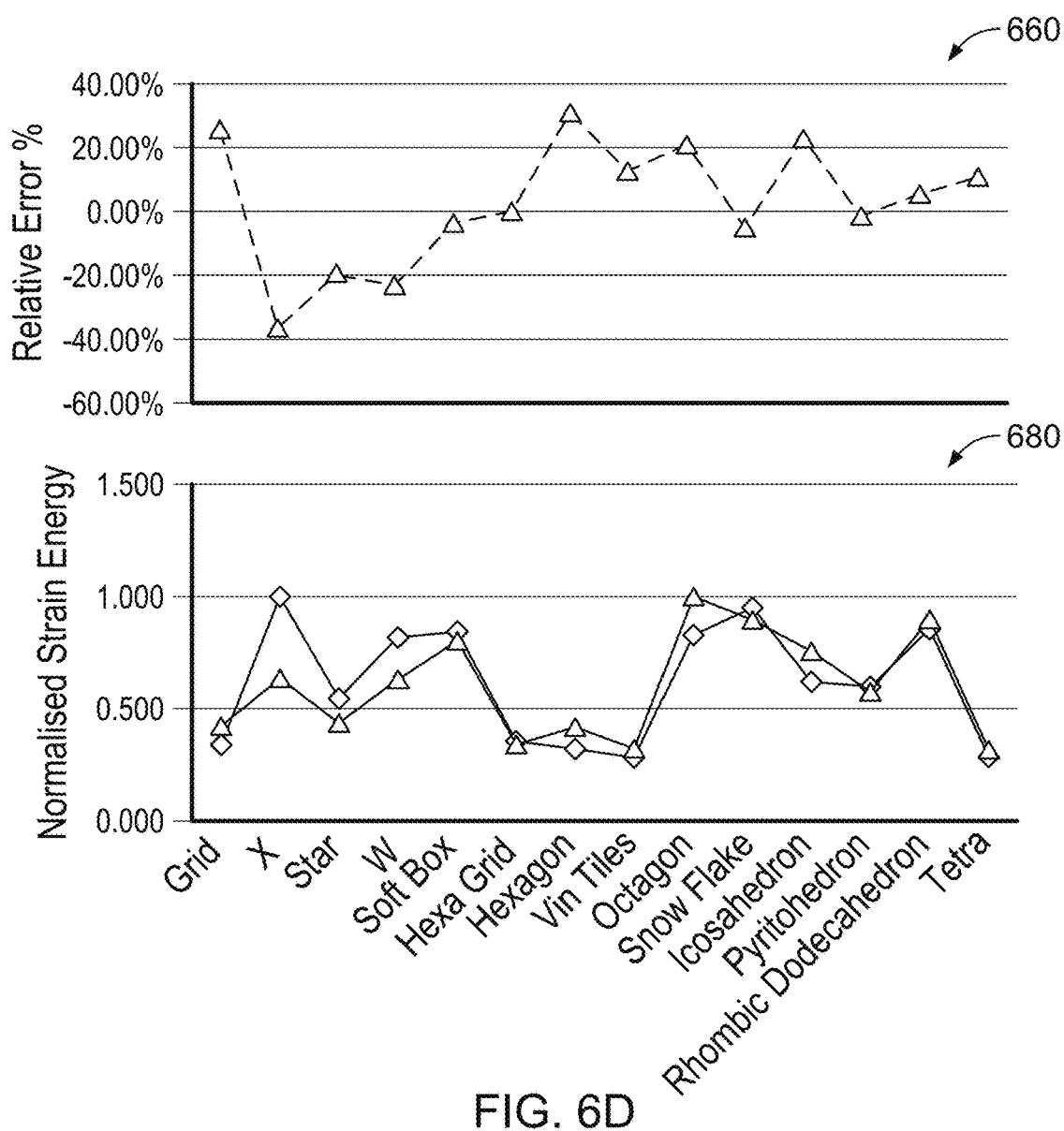
FIG. 6D

METHODS AND SYSTEMS FOR GENERATING LATTICE RECOMMENDATIONS IN COMPUTER-AIDED DESIGN APPLICATIONS

CROSS-REFERENCE TO RELATED APPLICATIONS

This application is a divisional of, and claims priority to, U.S. application Ser. No. 17/188,432, filed on Mar. 1, 2021, which is a continuation of U.S. application Ser. No. 16/096,623, filed on Oct. 25, 2018, and issued as U.S. Pat. No. 10,936,767, which is a national stage application under 35 U.S.C. § 371 and which claims priority to International Application No. PCT/EP2017/059918, filed on Apr. 26, 2017, which claims benefit under 35 U.S.C. § 119(e) of U.S. Provisional Application No. 62/328,219, filed on Apr. 27, 2016. The disclosures of the prior applications are considered part of and are incorporated by reference in the disclosure of this application.

BACKGROUND

This specification relates to computer aided structure creation, such as generation of lattice structures with three dimensional (3D) modeling programs for use with additive manufacturing or other manufacturing systems and techniques.

Computer-aided design (CAD) software has been developed and used to generate 3D representations of objects. Such software has also included software tools that can be used to enhance 3D parts using lattices and skins of various sizes, thicknesses and densities, where lattices are composed of beams or struts that are connected to each other at junctions, and skins are shell structures that overlay or encapsulate the lattices. Such tools allow rapid redesign of a 3D part to be lighter in weight, while still maintaining desired performance characteristics (e.g., stiffness and flexibility). Such software tools have used lattice topologies of various types that can be used to generate internal lattice structures that can be manufactured.

SUMMARY

This specification describes technologies relating to computer aided structure creation, such as generation of lattice structures with 3D modeling programs for use with additive manufacturing or other manufacturing systems and techniques.

In general, one or more aspects of the subject matter described in this specification can be embodied in one or more methods performed by a three dimensional (3D) modeling program on a computer including a processor and a memory, where the methods include: obtaining a mechanical problem definition including a 3D model of an object, which includes a design space in which a lattice is to be generated in the 3D model, wherein the mechanical problem definition includes (i) one or more isotropic solid materials identified as a baseline material model for the design space and (ii) one or more loading cases for the 3D model, the one or more loading cases specifying one or more boundary conditions that define how forces and restraints are applied to the 3D model for each of the one or more loading cases; generating a numerical simulation model for the 3D model of the object using the one or more loading cases and the one or more isotropic solid materials identified as the baseline material model for the design space; predicting performance of different lattice settings in different orientations in the design space using a lattice structural behavior model in place of the baseline material model in the numerical simulation model; and presenting a set of lattice proposals for the design space based on the predicted performance of the different lattice settings in the different orientations; wherein the lattice structural behavior model has been precomputed for the different lattice settings, which are generable by the 3D modeling program.

The predicting can include: loading the lattice structural behavior model for a lattice type; computing an efficiency factor for the lattice type across the 3D model of the object using the loaded lattice structural behavior model; and rotating a stress field associated with the numerical simulation model to predict performance of the lattice type in a different orientation. The different lattice settings can include lattice topology, volume fraction, and isotropic solid material parameters. Further, the lattice structural behavior model can be precomputed for the different lattice settings using machine learning techniques or interpolation.

The method can include: receiving a selection of one of the set of lattice proposals; and incorporating the selected lattice into the 3D model. Presenting the set of lattice proposals can include: showing a list of different lattice configurations in a user interface; receiving a selection of one or more of the different lattice configurations in the user interface; and launching actual simulations of the selected one or more of the different lattice configurations for detailed study and optimization.

The different lattice settings can include different lattice topologies, the lattice structural behavior model can include different lattice structural behavior models for the respective different lattice topologies, and the predicting can include swapping respective ones of the different lattice structural behavior models for the baseline material model in the numerical simulation model. The different lattice structural behavior models can be Representative Volume Elements (RVEs) that approximate structural behaviors of the different lattice settings, and each of the RVEs can express the behavior of a lattice as an anisotropic solid material. Furthermore, the numerical simulation can be is a Finite Element Analysis (FEA) model, and the predicting can include predicting the performance of the different lattice settings by swapping an RVE for a lattice with the baseline material model in the FEA model and approximating structural performance of the lattice using the RVE in the FEA model without creating an FEA model of the lattice.

Each of the RVEs can encode a function of lattice topology, volume fraction and material properties of the one or more isotropic solid materials identified as the baseline material model for the design space, and predicting the performance can include computing an RVE output for a given combination of lattice settings on demand. In some implementations, predicting performance of the different lattice settings can include: performing a single numerical simulation using the numerical simulation model for the 3D model, wherein the entire object is modeled using solid elements with isotropic material properties of the baseline material model; and comparing different lattice settings based on an increase in strain energy required to replace the material of each solid element with the structural behavior model of each respective lattice, wherein the strain energy is computed using a stress field from the single numerical simulation and a piecewise continuous strain field from each respective lattice.

According to another aspect, a system can include: a non-transitory storage medium having instructions of a three dimensional (3D) modeling program stored thereon; and one or more data processing apparatus configured to run the instructions of the 3D modeling program to perform any of the methods. The system can also include an additive manufacturing machine, wherein the one or more data processing apparatus are configured to run the instructions of the 3D modeling program to output the 3D model to the additive manufacturing machine for additive manufacturing of the object with the selected lattice incorporated therein.

Particular embodiments of the subject matter described in this specification can be implemented to realize one or more of the following advantages. Rather than letting the selection of lattice design variables (e.g., topology type, unit size, orientation, etc.) for a given design problem be done manually at the discretion of the user (who often has limited knowledge of the structural behavior of each topology type), suitable values for design variables like lattice topology type, unit size and orientation can be recommended without time consuming, repeated simulations. This can reduce the need to rely on users selecting lattice design variables based on prior knowledge or trial and error. Moreover, this can reduce the resource intensive aspect of design optimization since the number of simulations that would need to be repeated using different design variables can be reduced, and a user can be quickly directed to a suitable lattice starting point or points for a deeper exploration of the solution space, i.e., goal driven optimization of lattice beam thickness and/or other design variables. The efficiency of different lattices with different design parameters can be approximated in a progressively resource efficient manner. Moreover, the described processes can be implemented in a generative design process, where the computer automatically evaluates many different lattice settings and orientations to find good (or even the best) values for the lattice.

Lattice behavior models can be used during topology optimization. Topology optimization is an alternative to latticing for light weighting which can create voids in the design space by removing solid material. However, a combination of latticing and topology optimization can offer the best design in many cases. A two stage process can be employed, where a topology optimization stage is followed by a latticing stage. Using lattice behavior models during topology optimization, as a virtual lattice material, can assist in determining when to stop topology optimization in view of the following latticing stage, without actually having to create a lattice during the optimization stage. Thus, the topology optimization stage can work to produce the best distribution of solid and void across the design space while also being aware of the following latticing stage, during which, either a solid or void region is replaced by a lattice. Moreover, the lattice behavior models can also be used during numerical simulation of lattice designs where the unit size is low, resulting in a very high number of lattice beams. The virtual lattice material from the lattice behavior model can be used during such numerical simulation in place of the actual lattice to achieve faster simulation times.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIGS. 6B-6D show an example of topology comparison for a shaft load applied on a connector.

Like reference numbers and designations in the various drawings indicate like elements.

DETAILED DESCRIPTION

Figure 1A:
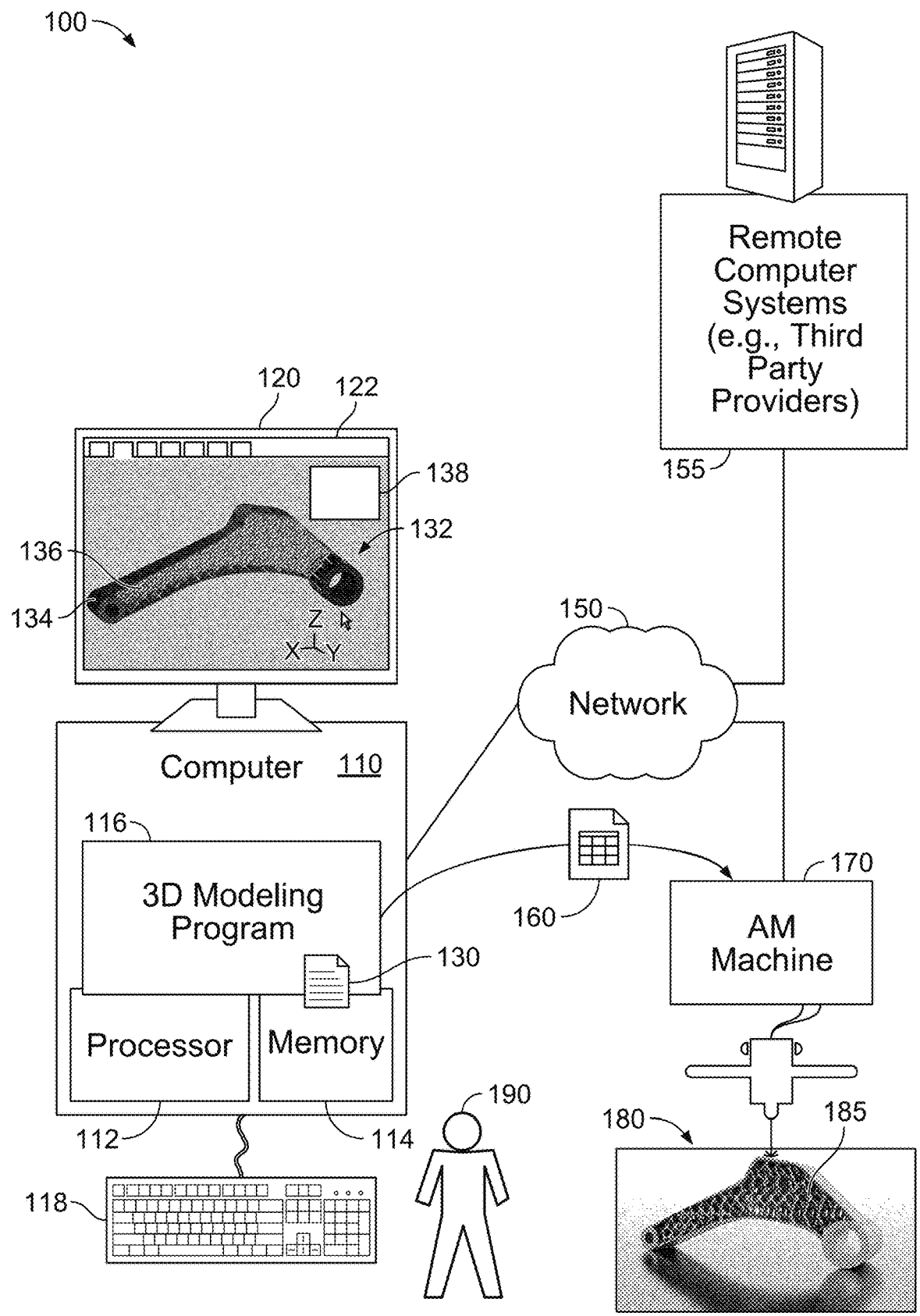
FIG. 1A shows an example of a system usable to design and manufacture lattice structures.

FIG. 1A shows an example of a system 100 usable to design and manufacture lattice structures. In the example shown, an additive manufacturing machine is used, but the invention is not limited to use with a particular type of manufacturing system. For example, the systems and techniques described herein can be used with various types of additive manufacturing (AM), three dimensional (3D) printing, subtractive manufacturing (SM), investment casting, etc.

A computer 110 includes a processor 112 and a memory 114, and the computer 110 can be connected to a network 150, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112.

Such programs can include a 3D modeling program 116, which can run locally on computer 110, remotely on a computer of one or more remote computer systems 155 (e.g., one or more third party providers' one or more server systems accessible by the computer 110 via the network 150), or both. The 3D modeling program 116 presents a user interface (UI) 122 on a display device 120 of the computer 110, which can be operated using one or more input devices 118 of the computer 110 (e.g., keyboard and mouse). Note that while shown as separate devices in FIG. 1A, the display device 120 and/or input devices 118 can also be integrated with each other and/or with the computer 110, such as in a tablet computer.

A user 190 can interact with the 3D modeling program 116 to create a 3D model 132. This can be done using known graphical user interface tools. The 3D model includes a portion 134 that is a traditional 3D model component, which can be defined using solid models (e.g., voxels) or surface models (e.g., B-Rep (Boundary Representation) and/or surface meshes). In addition, the UI 122 of the program 116 can allow the user 190 to provide input specifying one or more regions (a design space) of the 3D model in which to generate a lattice 136. For example, in some implementations, the user 190 can define a B-rep and specify a general type of lattice to include on one side of that B-rep, then the computer 110 can automatically generate the full lattice 136, including adding variation to the internal structure of the lattice 136.

In the example shown, the 3D model is a bracket, where the lattice 136 is added to improve strength and reduce weight. This is but one of many possible 3D models that can be designed and improved using lattice structures. For example, with additive manufacturing systems and techniques, there is opportunity to make parts both lighter and stronger by replacing internal regions of the part with lattice structures, as well adding lattice structures for other reasons, such as adding a lattice to a medical implant to improve the ability of bone to grow into and attach to the implant device. In addition, using the systems and techniques described below, appropriate lattice structures can be recommended to the user 190, and the design time needed to reach a good lattice solution can be reduced.

The 3D modeling program 116 can be programed to provide one or more user interface elements 138 that enable the user to specify materials and loading cases for the 3D model 132. The materials can be one or more solid materials for the portion 134 as well as one or more solid materials identified as a baseline materials model for the lattice 136 to be placed in the design space. Further, the loading cases can define loads in different directions to be borne. Thus, the UI 122 can be used to create a full mechanical problem definition for a part to be manufactured. In addition, the one or more user interface elements 138 can make recommendations for lattice settings to use to fill the design space.

Figure 1B:
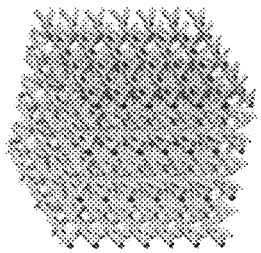
FIG. 1B shows examples of different lattice topology types.

Lattice creation by the 3D modelling program 116 can be regulated using several types of design variables. In addition, the 3D modelling program 116 can provide multiple lattice topology types for lattice creation. FIG. 1B shows examples of different lattice topology types 140 that can be made available in the 3D modelling program 116. These topologies include Grid, X, Star, W, Rhombic Dodecahedron, Crush, Tetra, Dark Horse, Vin Tiles, Cross Pattee, Pyritohedron, Icosahedron, Soft Box, Hexa Grid, Snow Flake, Hexagon, 3D Spider, and Octagon. Each topology type has unique structural behavior and would result in different optimal designs when used for optimization of structural components. Additionally, structural behavior varies with lattice orientation, unit size, and thickness, thus increasing the size of the solution space.

Referring again to FIG. 1A, in addition to recommending one or more lattice settings, as described in further detail below, the 3D modeling program 116 can also facilitate manipulation of the 3D model 132, which can include adding, deleting, or changing components 134 of the model 132, including components that intersect with the lattice 136, and also changing the extent and inclusion of the lattice 136 (e.g., by defining a containing envelope for the lattice structure 136). Once the user 190 is satisfied with the model 132 and its lattice 136, the 3D model 132 and its lattice 136 can be stored as a document 130 and/or used to generate another representation of the model (e.g., an .STL file for additive manufacturing) with the lattice 136 included therein. This can be done upon request by the user 190, or in light of the user's request for another action, such as sending the 3D model 132 to an AM machine 170, or other manufacturing machinery, which can be directly connected to the computer 110, or connected via a network 150, as shown. This can involve a post-process carried out on the local computer 110 or a cloud service to export the 3D model 132 to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files.

In any case, the 3D modeling program 116 can create an accurate representation of a combination of the 3D model component(s) 134 and the lattice 136, and provide a document 160 (of an appropriate format) to the manufacturing machine 170 to create a complete structure 180, including lattice structure 185. The manufacturing machine 170 can employ one or more additive manufacturing techniques, such as granular techniques (e.g., Selective Laser Sintering (SLS) and Direct Metal Laser Sintering (DMLS)), extrusion techniques (e.g., Fused Deposition Modelling (FDM)), or subtractive or any other computer aided manufacturing methods. In addition, the user 190 can save or transmit the 3D model 132, with its lattice 136, for later use. For example, the 3D modeling program 116 can store the document 130 that includes the 3D model 132 and its lattice 136.

Moreover, while the user 190 may be allowed to select design variables like topology type, unit size, uniform thickness, variable thickness bounds or orientation for a given design problem manually, the 3D modeling program 116 can also make recommendations (within any limits defined by the user 190 through the program 116) based on the structural behavior of lattice design variables. This can reduce the time needed for the design optimization process since the number of repetitions using different design variables to compare the resulting alternative designs can be reduced. The 3D modeling program 116 can be programmed to rapidly compare and recommend suitable values for design variables like lattice topology type, unit size and orientation without any repeated simulations. This can direct the user to a suitable starting point or points (e.g., the top five predictions) for a deeper exploration of the solution space.

For example, the objective can be to rank the available lattice topologies (and potentially the design variables therefor) for suitability within a current design project. Let $\Omega = \Omega^s \cup \Omega^l \cup \Gamma$ denote the design geometry comprising of a solid ($\Omega^s$), lattice ($\Omega^l$) and skin ($\Gamma$) parts. The stiffness of the lattice part, denoted by $K^l$, is dependent on the topology type $T_i \in \{X, \text{grid}, \text{column} \ldots\}$. Hereafter, the set of all topology types is denoted by T. Consider the following optimization problem where the lattice needs to be optimized to minimize an objective function J while satisfying a set of inequality constrains $c_j$ $$\text{minimise } J(T_i, m_i) \quad (1a)$$

$$\text{such that } c_j(s(T_i, m_i)) \leq 0 \; j=1, \ldots, n_c \quad (1b)$$

where $T_i$ denotes the topology type, $m_i$ is the vector of other lattice design variables used to change lattice geometry, and $n_c$ denotes the number of constraints. $s(T_i, m_i)$ is a vector of sensitivities obtained after solving a Boundary Value Problem (BVP). For example, the 3D modelling program 116 can use the lattice unit size & thicknesses as the design variables and use Von Mises stresses & volume as sensitivities. The BVP is a structural equilibrium problem and the objective is to minimize total volume while satisfying global Von Mises stress constraints.

The ultimate objective can be to obtain a sequence $(T_i, m_1), (T_2, m_2), \ldots$ such that $$J_{min}(T_1, m_1) \leq J_{min}(T_2, m_2) \leq \ldots \quad (2)$$

where $T_1, T_2, \ldots \in T$ and $J_{min}(T_i, m_i)$ is the minimum value of the objective function obtained at the end of optimizing the lattice using design variables $T_i, m_i$. Note that the desired sequence depends on the values of $m_i$ s at the end of optimization and cannot be predicted at the start without significant errors in the prediction. In this context, the following alternative objective can be used which compares the strain energy of each topology and other design variables at the start of optimization $$\Pi^{int}(T_1, \overline{m}_1) \leq \Pi^{int}(T_2, \overline{m}_2) \leq \ldots \quad (3)$$

where $\overline{m}_i$ s are the initial value of the design variables and $\Pi^{int}$ is the strain energy. Note that while the examples discussed below use strain energy to generate lattice structural behavior models, other forms of energy can also be used to generate models that approximate lattice behavior, such as thermal energy or electric potential energy.

Figure 2A:
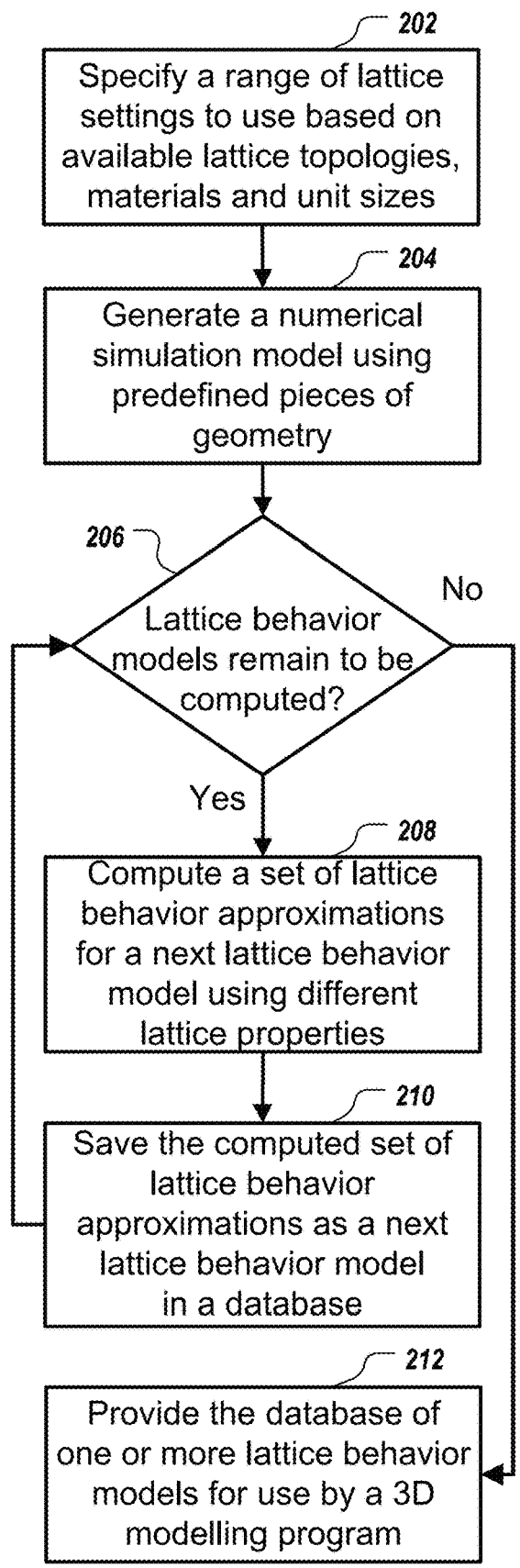
FIG. 2A shows an example of a process of precomputing one or more lattice structural behavior models for different lattice settings to support generation of lattice recommendations.

FIG. 2A shows an example of a process of precomputing one or more lattice structural behavior models for different lattice settings to support generation of lattice recommendations. In some implementations, this precomputation process is performed when the program that will use the lattice structural behavior models (e.g., 3D modeling program 116) is first created. In some implementations, this precomputation process is performed by one or more remote computer systems 155, as needed, and the updated and/or new lattice structural behavior models are then sent to the program (e.g., 3D modeling program 116) over a network 150 to update the program. In some implementations, this precomputation process is performed by the program itself (e.g., by 3D modeling program 116 upon initialization).

At 202, a range of lattice settings are specified for which the precomputation will be performed. The range of settings can be based on available lattice topologies, materials, and unit sizes, which can be generated by the program (e.g., 3D modeling program 116 in system 100). For example, the available lattice topologies can be the different lattice topology types 140 shown in FIG. 1B, the materials can be the different types of materials that can be used to construct the beams or struts of the lattice (e.g., using AM machine 170), and the unit sizes can be the different lattice cell sizes that are manufacturable using a given technology (e.g., using AM machine 170 and based on the materials used to construct the object being manufactured). Note that the range specified can include different types of lattice settings (e.g., different topologies), different permitted value settings for a given topology (e.g., an upper and lower limit for volume fraction), or both.

Figure 2B:
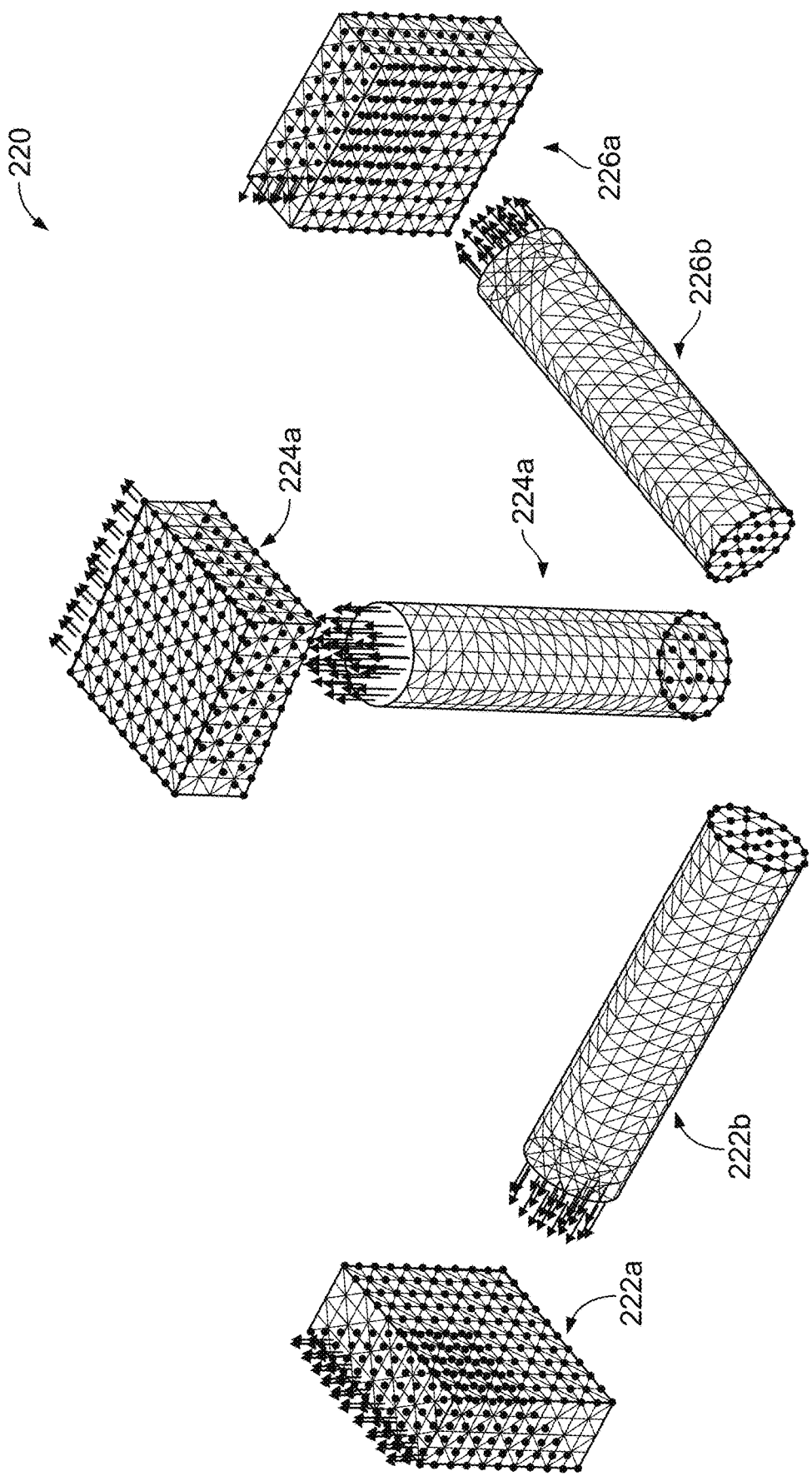
FIG. 2B shows a numerical simulation model setup involving numerical models usable to compute all rows in a linear elastic constitutive matrix to compute material properties of a given lattice.

At 204, a numerical simulation model is generated using predefined pieces of geometry, where the numerical simulation models the physical properties and behavior of an object. In some implementations, this numerical simulation model is a Finite Element Analysis (FEA) model that uses six pieces of geometry. For example, FIG. 2B shows a numerical simulation model setup 220 involving numerical models usable to compute rows in a linear elastic constitutive matrix to compute material properties of a given lattice. The setup 220 includes six models 222a, 222b, 224a, 224b, 226a, 226b, three of which can be used to measure the direct stress, and the other three can be used to measure shear components for a full numerical test. A beam-shell FE model can be used with constant shell element thickness (e.g., 1 mm thickness) and variable beam thickness depending on volume fraction.

At 206, a check is made as to whether one or more lattice behavior models remain to be computed for all requested lattice settings. In the example being described, the lattice settings include lattice topology, volume fraction, and isotropic solid material parameters, the numerical simulation model is generated only once, and a single lattice behavior model is created for each separate lattice topology. However, many variations on this precomputation approach can be used in different implementations. For example, a separate numerical simulation model can be generated 204 for each respective lattice behavior model being generated. As another example, more than one type of lattice behavior model can be created for each of one or more different lattice topologies (e.g., lattice behavior models computed using different analysis methods).

At 208, a set of lattice behavior approximations is computed for a next lattice behavior model using the numerical simulation model and different lattice properties (e.g., different volume fractions and different isotropic solid material properties). In some implementations, the approach taken can involve using Representative Volume Elements (RVEs) to approximate the structural behavior of a given lattice with different lattice design variables. Such RVEs enable the behavior of a lattice to be expressed as an anisotropic solid material. The variation of structural behavior with each type of design variable is studied in order to create a database of RVEs. This allows the construction of RVEs for different lattice design variables.

In some implementations, comparisons of alternative designs using different lattice topologies is done such that the amount of material used in each design is kept constant. For a given domain with volume V, the volume of a uniform thickness lattice (all lattice beams have constant thickness), denoted by $V^l$, depends on the unit size u and thickness t. The variation of lattice volume fraction $$f_v = V^l / V \quad (4)$$

with u and t being studied to this end. Define characteristic length $l_i = f(u, T_i)$ of topology type $T_i$ as the ratio of lattice volume per unit cell, denoted by $v^l$, to lattice cross-section area $$l_i = \frac{v^l}{\pi t^2 / 4}. \quad (5)$$

Note that Equation 5 ignores the influence of junctions and overlaps and assumes beams of circular cross section in the lattice (other assumptions can be made for approximation in various implementations). Table 1 below shows the characteristic length of several of the topologies 140 shown in FIG. 1B.

TABLE 1

Characteristic Lengths of Different Topology Types

| Topology | $l_i/u$ |
|---|---|
| Grid | 3 |
| X | 6.93 |
| Star | 7.74 |
| W | 7.17 |
| Dark Horse | 5.63 |
| Vin Tiles | 8.46 |
| Cross Pattee | 13.41 |
| Soft Box | 7.67 |
| Hexa Grid | 2.09 |
| Snow flake | 11.68 |
| Hexagon | 10.70 |
| Octagon | 6.27 |
| 3D Spider | 8.66 |
| Icohsahedron | 14.67 |
| Pyritohedron | 10.73 |
| Phombic Dedecahedron | 8.76 |
| Crush | 15.99 |
| Tetra | 8.93 |

It is clear that $l_i$ is linear in u:

$$l_i = c_i u. \qquad (6)$$

Note that one or more of these lattice topologies, as well as other lattice topologies, can be used, and different approaches can be taken to characterizing the different lattice topologies made available in the 3D modelling program 116.

In any case, in this example, the volume of the lattice is now given by $$V^l = v^l \left(\frac{V}{u^3}\right)$$
$$= \left(\frac{\pi t^2}{4} c_i u\right) \cdot \left(\frac{V}{u^3}\right)$$
$$= \frac{\pi t^2}{4} c_i \frac{V}{u^2}.$$

Figure 2C:
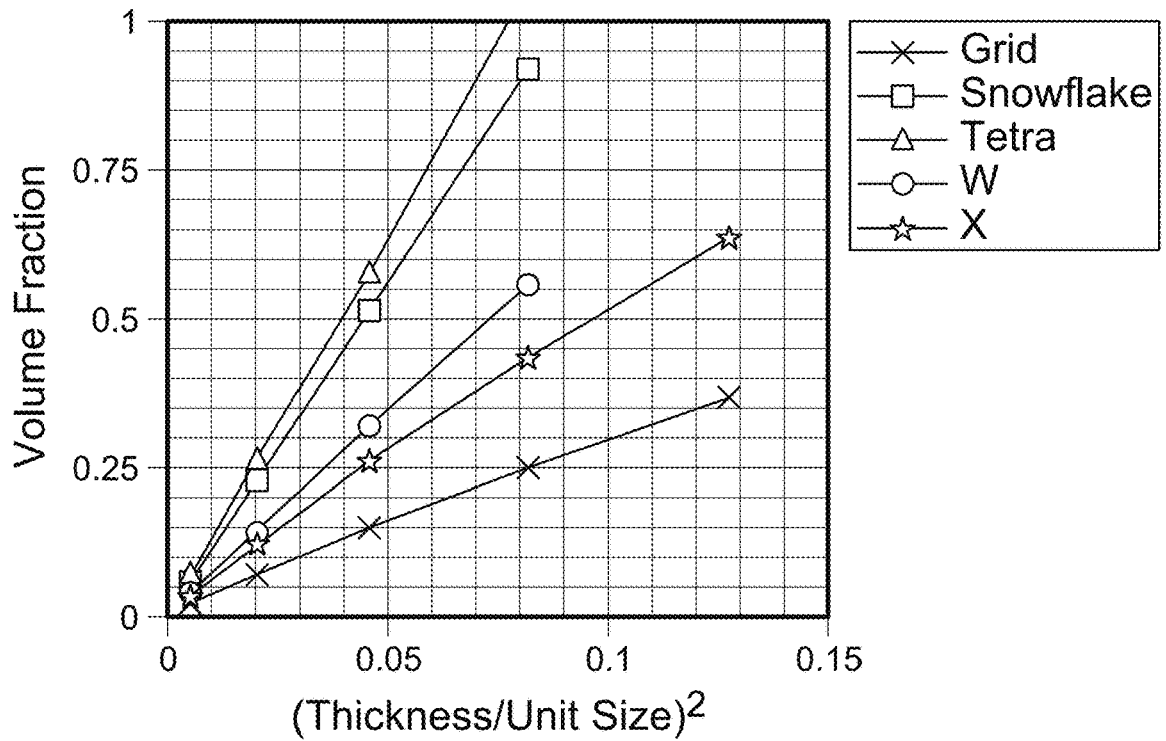
FIG. 2C plots examples of variation of volume fraction for several lattice typology types.

This implies that the volume fraction varies linearly with $t^2/u^2$ for a given topology type. FIG. 2C shows a graph 230 of variation of volume fraction with $t^2/u^2$ ratio (thickness and unit size) for several typology types, which can be used in the 3D modelling program. The lattices for the graph 230 were created using a cube shaped domain of dimensions 50×50×50 mm, the unit size is kept constant at u=7 mm, and the thickness is varied t∈{0.5, 1, 1.5, . . . , 2.5} mm. The volume fraction can be expressed as $$f_v = \frac{\pi c_i}{4} \frac{t^2}{u^2} \qquad (7)$$

Figure 2D:
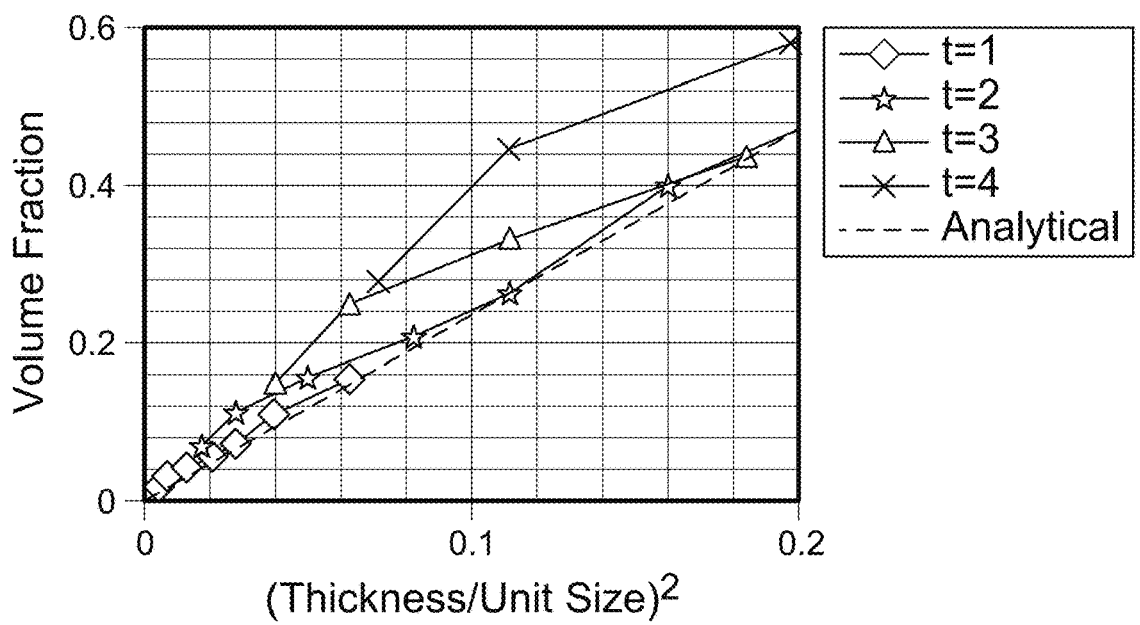
FIG. 2D plots examples of variation of grid topology volume fraction for different units sizes.

FIG. 2D shows a graph 250 of the variation of volume fraction at large unit sizes. As before, the lattices are computed using grid topology in a cube shaped domain of dimensions 50×50×50 mm, but the unit size is now varied at constant thickness values resulting in different $t^2/u^2$ ratios and volume fractions.

In some implementations, an important simplification that can be used is to consider the lattice as an anisotropic solid material. Such an approximation enables the lattice domain to be simulated using a solid element based formulation instead of a more computationally expensive beam element based formulation. In this context, the solid elements correspond to representative volume elements (RVEs) of the lattice. The constitutive model of a linear elastic material can be expressed in matrix form as follows $$\varepsilon = \hat{D}\sigma \qquad (8)$$

where σ, ε contain the components of the Cauchy stress tensor and the corresponding strain tensor given by $$\sigma^T = \{\sigma_{xx}, \sigma_{yy}, \sigma_{zz}, \sigma_{yz}, \sigma_{xz}, \sigma_{xy}\} \qquad (9a)$$

$$\varepsilon^T = \{\varepsilon_{xx}, \varepsilon_{yy}, \varepsilon_{zz}, \gamma_{yz}, \gamma_{xz}, \gamma_{xy}\} \qquad (9b)$$

and $\hat{D}$ denotes the linear elastic constitutive matrix given by $$D = \begin{bmatrix} a & b & b & 0 & 0 & 0 \\ b & a & b & 0 & 0 & 0 \\ b & b & a & 0 & 0 & 0 \\ 0 & 0 & 0 & c & 0 & 0 \\ 0 & 0 & 0 & 0 & c & 0 \\ 0 & 0 & 0 & 0 & 0 & c \end{bmatrix} \qquad (10)$$

$$a = \frac{1}{E}, b = \frac{-v}{E}, c = \frac{E}{2(1+v)}$$

with E,v denoting the Young's modulus and Poisson's ratio respectively. However, for an anisotropic material with no planes of symmetry, the constitutive matrix takes the following form $$\hat{D} = d_{ij}, i,j \in \{1,2, \ldots, 6\}. \qquad (11)$$

Note that many topology types used can have certain symmetries which are reflected in the constitutive matrix. For example, the symmetric topologies X, Grid and Snowflake have only three distinct entries in the constitutive matrix as in a linear elastic material.

Each distinct entry in the constitutive matrix should be evaluated by analytical, experimental or numerical means. In some implementations, the latter is used where each column in the $\hat{D}$ matrix is numerically computed by applying unit stress values on a lattice domain. Essentially, the entries of the $i^{th}$ column in the $\hat{D}$ matrix are given by the components of the vector ε obtained by setting the $i^{th}$ stress component to 1. See below for an example with i=2

$$\begin{bmatrix} \varepsilon_{xx} \\ \varepsilon_{yy} \\ \varepsilon_{zz} \\ \varepsilon_{yz} \\ \varepsilon_{xz} \\ \varepsilon_{xy} \end{bmatrix} = \begin{bmatrix} d_{11} d_{12} d_{13} d_{14} d_{15} d_{16} \\ d_{21} d_{22} d_{23} d_{24} d_{25} d_{26} \\ d_{31} d_{32} d_{33} d_{34} d_{35} d_{36} \\ d_{41} d_{42} d_{43} d_{44} d_{45} d_{46} \\ d_{51} d_{52} d_{53} d_{54} d_{55} d_{56} \\ d_{61} d_{62} d_{63} d_{64} d_{65} d_{66} \end{bmatrix} \begin{bmatrix} 0 \\ 1 \\ 0 \\ 0 \\ 0 \\ 0 \end{bmatrix}$$

$$\varepsilon = [d_{12} d_{22} d_{32} d_{42} d_{52} d_{62}]$$

Note that the setup 220 from FIG. 2B has six numerical models 222a, 222b, 224a, 224b, 226a, 226b. These six numerical models can be used to compute all six rows in the $\hat{D}$ matrix for a given lattice. As noted above, a full numerical test can be done using the six models, with three each for measuring the direct stress and shear components, respectively. For example, an axially loaded cylinder (e.g., of diameter 25 mm and height 100 mm) can be used to compute the rows corresponding to direct stresses. A box shaped domain (e.g., of dimensions 50×50×19.635 mm) with a unit shear stress can be used to compute the rows corresponding to shear stresses. Note that dimensions of the cylinder and box models should be chosen such that the same volume of lattice materials is present in each test.

Figure 2E:
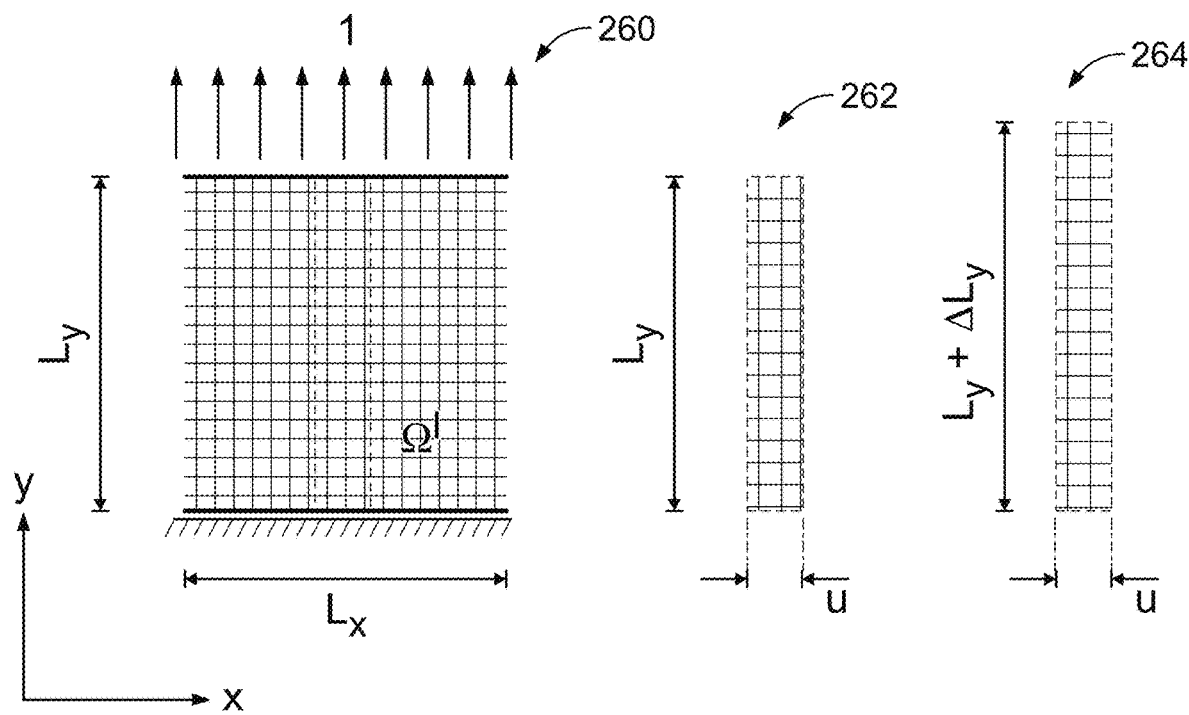
FIG. 2E shows a 2D (two dimensional) diagram of the setup from FIG. 2B, including a loading setup, a vertical strip for measuring strain, and a deformed vertical strip.

FIG. 2E shows a 2D (two dimensional) diagram of the setup 220 used to numerically evaluate $d_{22}$ by setting $\sigma_{yy}=1$. In this numerical test, a loading setup 260, a vertical strip 262 for measuring strain, and a deformed vertical strip 264 can be used. Following the standard definition of Engineering strain, the required entry in the constitutive matrix is given by $$d_{22} = \frac{L_y + \Delta L_y - L_y}{L_y} = \frac{\Delta L_y}{L_y}. \tag{12}$$

The numerical test described above is capable of generating the RVE for a lattice with given properties (i.e., $T_i$, u, $f_v$, E, v). In some implementations, the RVE of a lattice with arbitrary properties should be readily available in the 3D modelling program. This can involve precomputing the RVE, such as by providing a database of $\hat{D}$ matrices, which are precomputed. In this context, it is desirable to examine the variation of $\hat{D}$ matrix entries with each of the lattice properties.

Figure 2F:
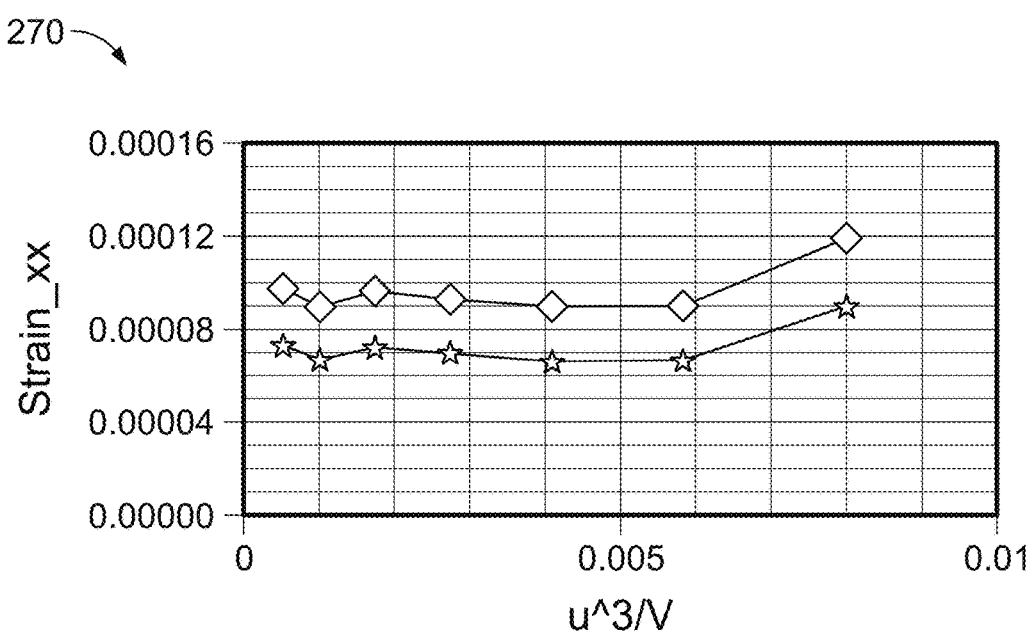
FIG. 2F shows a graph of variation in grid topology strain at large unit sizes for an applied unit stress in a direction.

Referring again to FIG. 2A, the computing 208 of lattice behavior approximations can also include calculating variation with unit size. When using large unit sizes, the lattice properties may vary significantly due to the coarse lattice. FIG. 2F shows a graph 270 of variation in grid topology strain $\epsilon_{xx}$ at large unit sizes for an applied unit stress in x direction, i.e., $\sigma_{xx}=1$ MPa. The lattice was created using a cube shaped domain of dimensions 50×50×50 mm. The unit size was varied $u \in \{4, 5, \ldots, 10\}$ mm while keeping volume fraction constant (see Equation 7). The material Nickel Alloy IN718 for EOSIN™ 270 (Young's modulus 170000 MPa, Poisson's ratio 0.29) was used. In FIG. 2F, the variation of a material property $\epsilon_{xx}$ is plotted for different values of $u^3/V$ clearly indicating the deviation at high u values. In light of this, it is desirable to define an upper limit of $u^3/V$ beyond which the material properties in the $\hat{D}$ matrix are invalid. For the example in FIG. 2F, the material properties are valid for $u^3/V \leq 0.006$).

In addition, a correction should be made to the total volume to account for situations where loading and stresses are localized. Essentially, the upper bound on unit size should be computed with respect to an effective total volume excluding regions of very low stress. For example, $V_{0.1}^{90\%}$ can be used as the effective volume which represents the total volume of elements with Von Mises stress higher than $0.1\sigma_{90\%}^{vm}$ ($90^{th}$ percentile highest Von Mises stress in the model is denoted by $\sigma_{90\%}^{vm}$). Note that $90^{th}$ percentile is used to avoid influence of stress singularities.

Figure 2G:
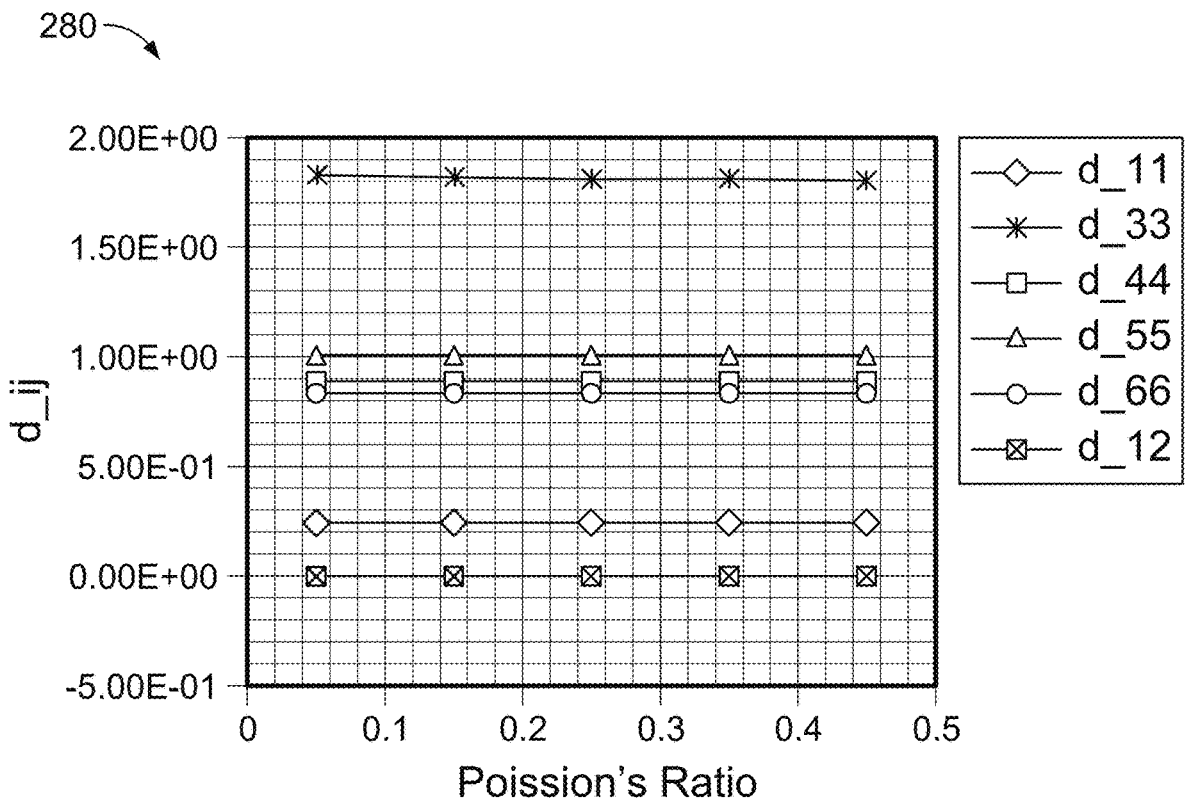
FIG. 2G shows an example for Tetra topology of variation of $\hat{D}$ matrix entries with Poisson's ratio.

Further, considering the porous nature of a lattice microstructure, the variation with Poisson's ratio is expected to be minimal. FIG. 2G shows a graph 280 with an example for Tetra topology of variation of $\hat{D}$ matrix entries with Poisson's ratio. For this example, the following lattice properties were used: $T_i$=Tetra topology, $u^3/V=0.002$, $f_v=0.15$ and $E=100$.

Figure 2H:
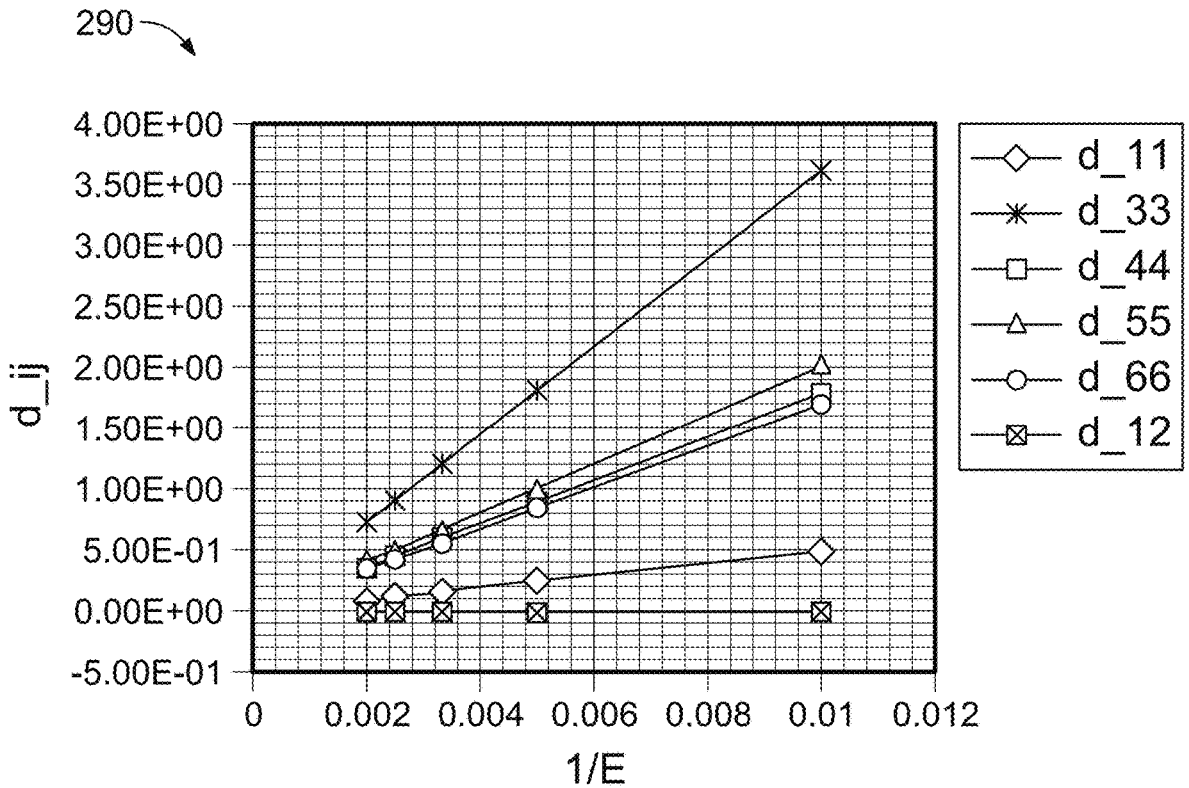
FIG. 2H shows an example of variation of $\hat{D}$ matrix entries with Young's modulus.

Given the use of linear elastic materials, the variation of $\hat{D}$ matrix entries with Young's modulus is linear, as shown in FIG. 2H, which shows a graph 290 of variation of $\hat{D}$ matrix entries with Young's modulus. In this example, the following lattice properties were used: $T_i$=Tetra topology, $u^3/V=0.002$, $f_v=0.15$ and $v=0.33$. However, note that each $\hat{D}$ matrix entry $d_{ij}$ has a different proportionality constant and should to be corrected individually $$d_{ij}(\tilde{E}, \tilde{v}) = 1/\tilde{E} \frac{d_{ij}(E^0, v^0)}{1/E^0} \tag{13}$$

where $d_{ij}(\tilde{E},\tilde{v})$ and $d_{ij}(E^0,v^0)$ denote the required entry and the available entry computed with $\tilde{E}$, $\tilde{v}$ and $E^0 v^0$ respectively.

In addition to variation with material properties, variation with lattice volume fraction can also be addressed at 208. Given the quartic relationship between bending stiffness and radius for circular sections, the relationship between $d_{ij}$ and $f_v$ can be expressed using a fourth-order polynomial $$d_{ij} = af_v^4 + bf_v^3 + cf_v^2 + df_v + e \tag{14}$$
$$= \{abcde\}T\{f_v^4 f_v^3 f_v^2 f_v 1\}$$

Figure 3A:
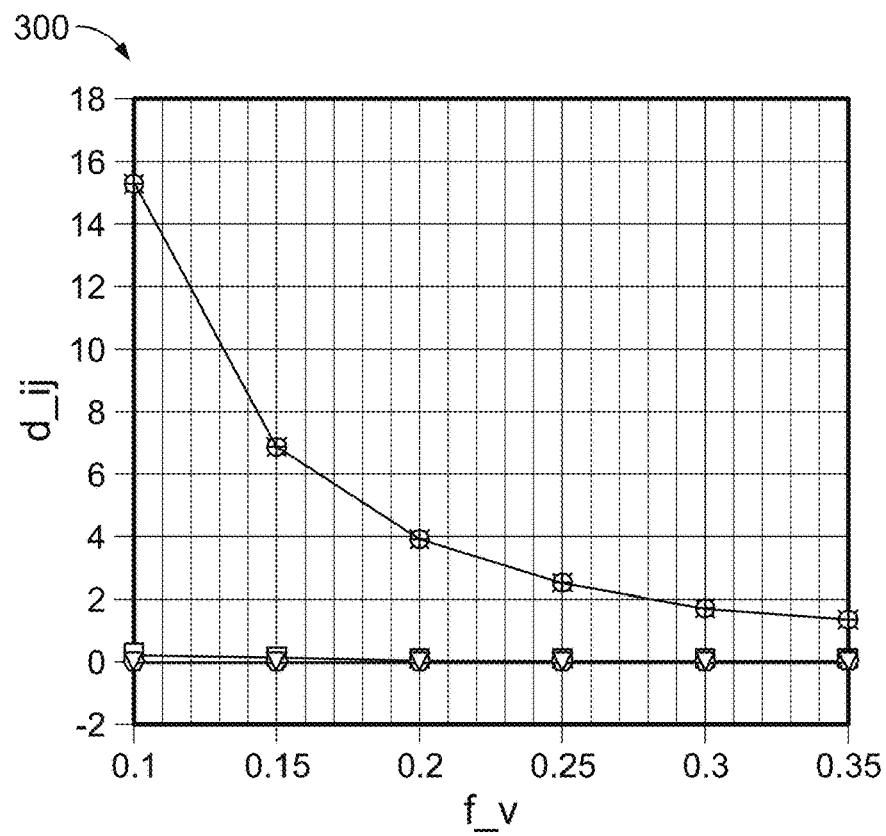
FIGS. 3A-3D show examples of variation of $\hat{D}$ matrix entries with lattice volume fraction for several topology types.
Figure 3B:
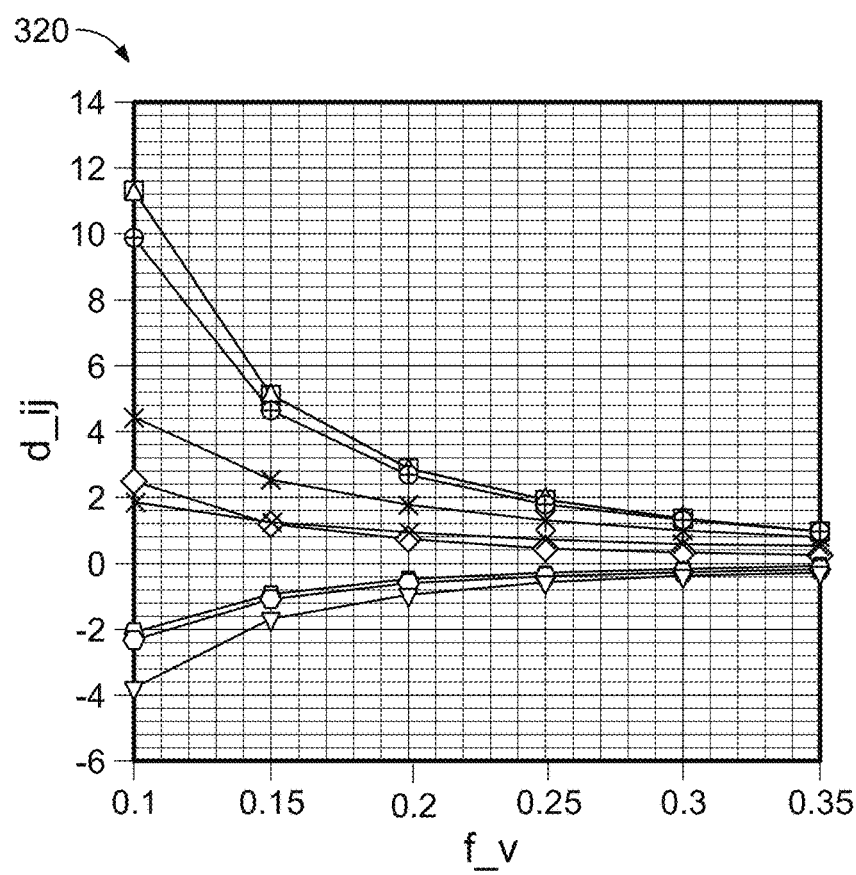
Figure 3C:
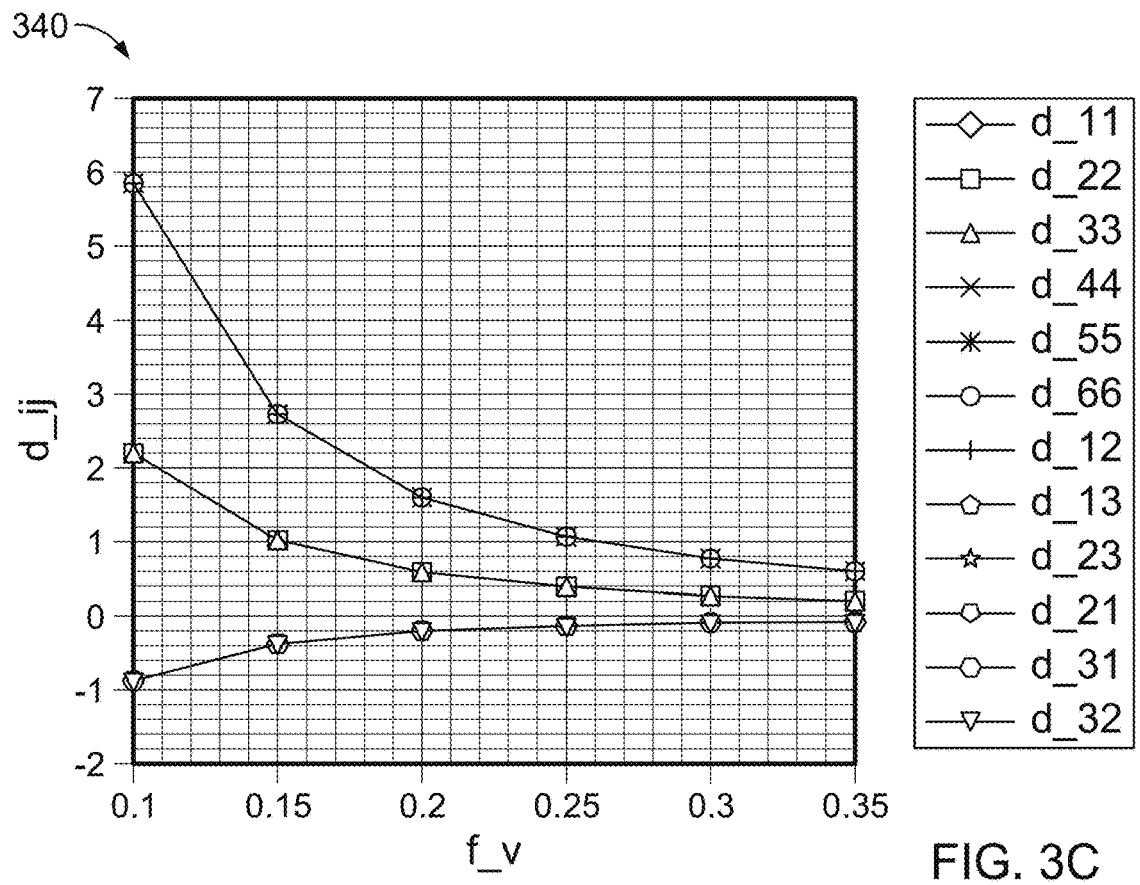
Figure 3D:
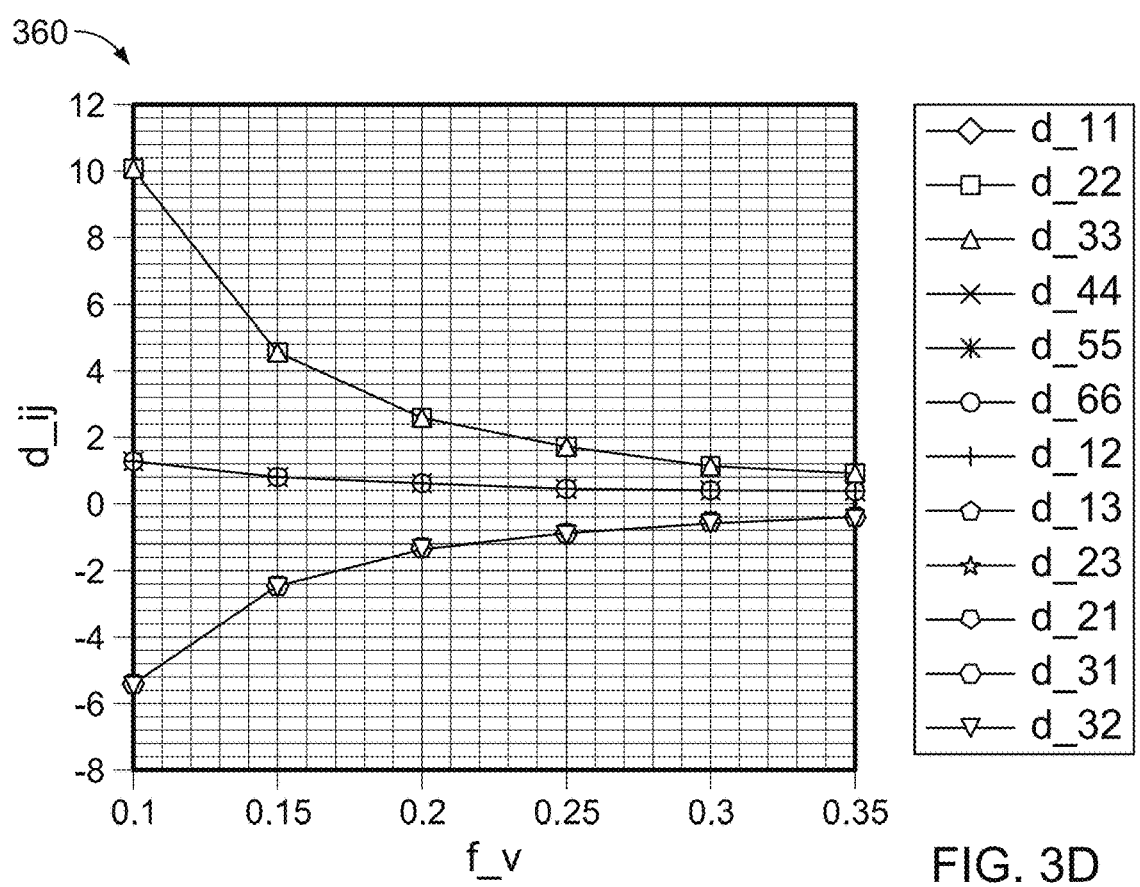

The required polynomial coefficients can be generated by numerically computing D for several discrete values of $f_v$ less than unity, e.g., $f_v \leq 0.7$. FIGS. 3A-3D show examples of variation of $\hat{D}$ matrix entries with lattice volume fraction, with $f_v \in \{0.1, 0.15, 0.2, 0.25, 0.3, 0.35\}$. In these examples, the following lattice properties are kept constant: $u^3/V=0.002$, E=100 and v=0.33. FIG. 3A shows a chart 300 of $\hat{D}$ matrix entries versus lattice volume fraction for a Grid topology. FIG. 3B shows a chart 320 of $\hat{D}$ matrix entries versus lattice volume fraction for a Soft Box topology. FIG. 3C shows a chart 340 of $\hat{D}$ matrix entries versus lattice volume fraction for a Vin Tiles topology. FIG. 3D shows a chart 360 of $\hat{D}$ matrix entries versus lattice volume fraction for an X topology. In FIGS. 3A-3D, note that high values of $f_v$ are not computed owing to the dependence on Poisson's ratio. Instead, this is taken into account by using the $\hat{D}$ of the fully solid material corresponding to the data point $f_v=1$.

Once the set of lattice behavior approximations have been computed at 208, the set can be saved at 210 as a next lattice behavior model in a database for use in later prediction of lattice properties, e.g., to predict an RVE for arbitrary lattice properties. In some implementations, generating a complete lattice RVE database involves generating a lattice RVE database using several discrete $d_{ij} \in D$ data points precomputed for some reference $f_v^0$, $E^0$, $v^0$ values. The procedure for computing the RVE for arbitrary $\tilde{f}_v$, $\tilde{E}$, $\tilde{v}$ can be as follows:

1. Correct precomputed discrete $d_{ij}$ values to account for actual Elastic modulus using Equation 13.

2. Compute $d_{ij}(\tilde{E},\tilde{v})$ at $f_v=1$ using Equation 10 and add it to the set of data points D.

3. Pick five discrete $d_{ij}$ data points around the requested $\tilde{f}_v$ value.

$$\{f_1,f_2,f_3,f_4,f_5\} \in D$$

$$f_1 < f_2 < f_3 < f_4 < f_5$$

$$f_1 \leq \tilde{f}_v \leq f_5$$

4. Find the polynomial coefficients in Equation 14 using $$\begin{bmatrix} a \\ b \\ c \\ d \\ e \end{bmatrix} = \begin{bmatrix} (f_1)^4 (f_1)^3 (f_1)^2 f_1 1 \\ (f_2)^4 (f_2)^3 (f_2)^2 f_2 1 \\ (f_3)^4 (f_3)^3 (f_3)^2 f_3 1 \\ (f_4)^4 (f_4)^3 (f_4)^2 f_4 1 \\ (f_5)^4 (f_5)^3 (f_5)^2 f_5 1 \end{bmatrix}^{-1} \begin{bmatrix} d_{ij}(f_1) \\ d_{ij}(f_2) \\ d_{ij}(f_3) \\ d_{ij}(f_4) \\ d_{ij}(f_5) \end{bmatrix}$$

5. The lattice RVE for given $\tilde{f}_v$, $\tilde{E}$, $\tilde{v}$ can now be computed using Equation 14 as follows $$d_{ij} = \{abcde\}^T \{\tilde{f}^4_v \tilde{f}^3_v \tilde{f}^2_v \tilde{f}_v 1\}$$

Figure 3E:
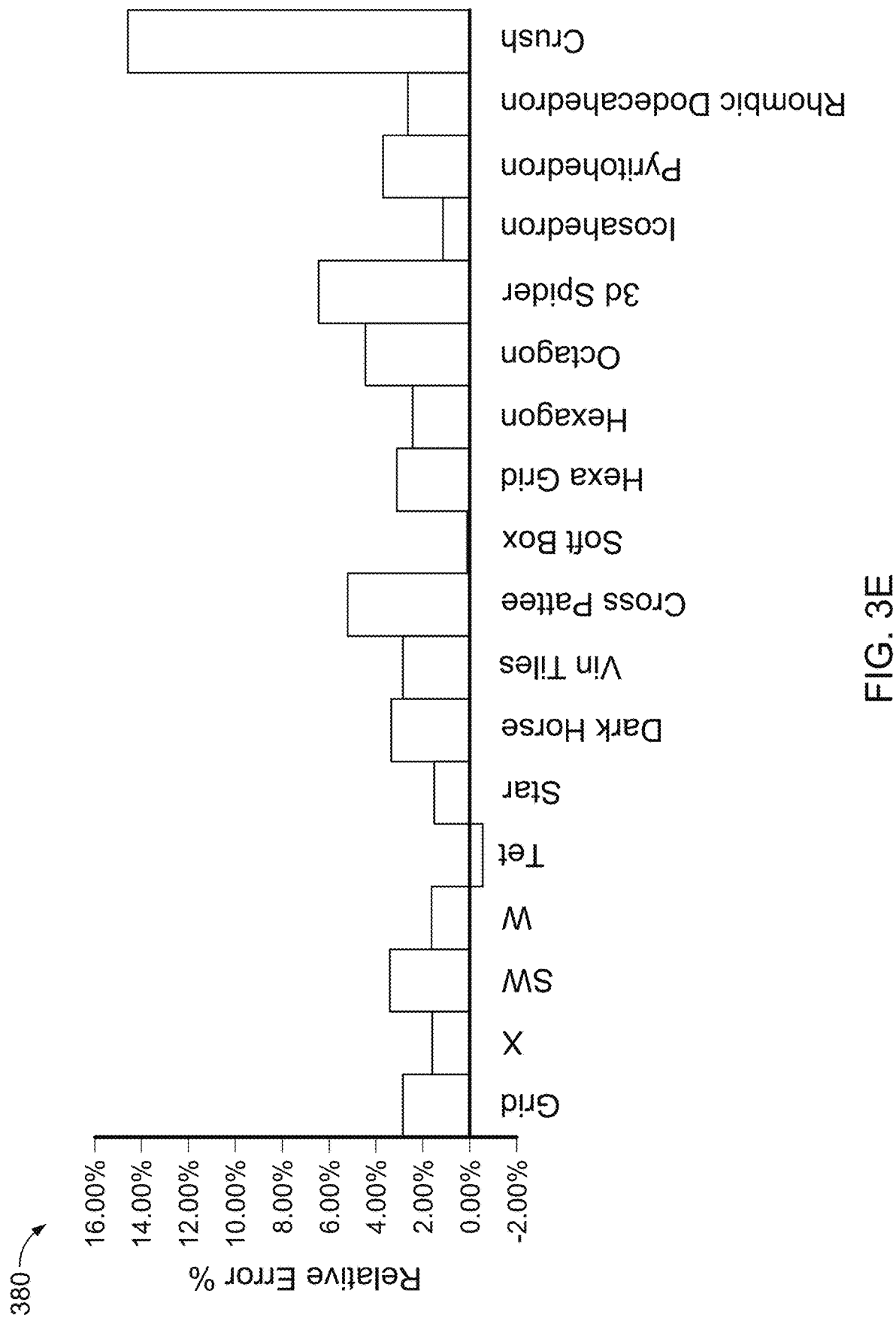
FIG. 3E shows relative error between actual and predicted $\hat{D}$ matrices.

FIG. 3E shows a chart 380 of the relative error in actual and predicted $\hat{D}$ matrices. The RVE database was generated with $E^0=100$, $v^0=0.33$, the lattice RVE is predicted at $\tilde{E}=1e^5$, $\tilde{v}=0.1$, and the error is computed using the matrix trace $tr(\hat{D})$.

Referring again to FIG. 2A, once the process determines at 206 that all the needed lattice behavior models have been computed and saved in the database, the database of one or more lattice behavior models is provided 212 for use by a 3D modelling program. Note that the examples discussed above involve using a mixture of linear interpolation of Elastic modulus and polynomial approximation for different volume fractions. However, other implementations can use approaches other than a mixture of linear and non-linear interpolation. For example, machine learning techniques can be used, such as using a neural network machine learning process to compute a data point in the behavior model of a of lattice. The inputs to the neural network machine learning process can be various properties of the lattice, e.g., volume fraction, unit size, and topology information, and the output of the neural network machine learning process can then be one or more lattice behavior models, e.g., a function that describes the behavior of the RVE with an output from the neural network machine learning process.

For example, a machine learning algorithm (e.g., a neural network algorithm) can be provided with a set of inputs and outputs to process to develop a model that maps the inputs to the outputs in accordance with the available data points. The inputs can include lattice topology type (e.g., a selection from a set of different types of predesigned lattice units that are used in a data gathering step), volume fraction (e.g., a value between 0.0 and 1.0 calculated from a uniform thickness given for a lattice), unit size (e.g., in mm), one or more material properties (e.g., modulus of elasticity and Poison's ratio), orientation, or a combination of these. The outputs can be a 6 by 6 matrix that describe the behavior of the RVE. In general, data can be gathered from different finite element analyses to predict the behavior of the RVE for different lattice properties.

Figure 4A:
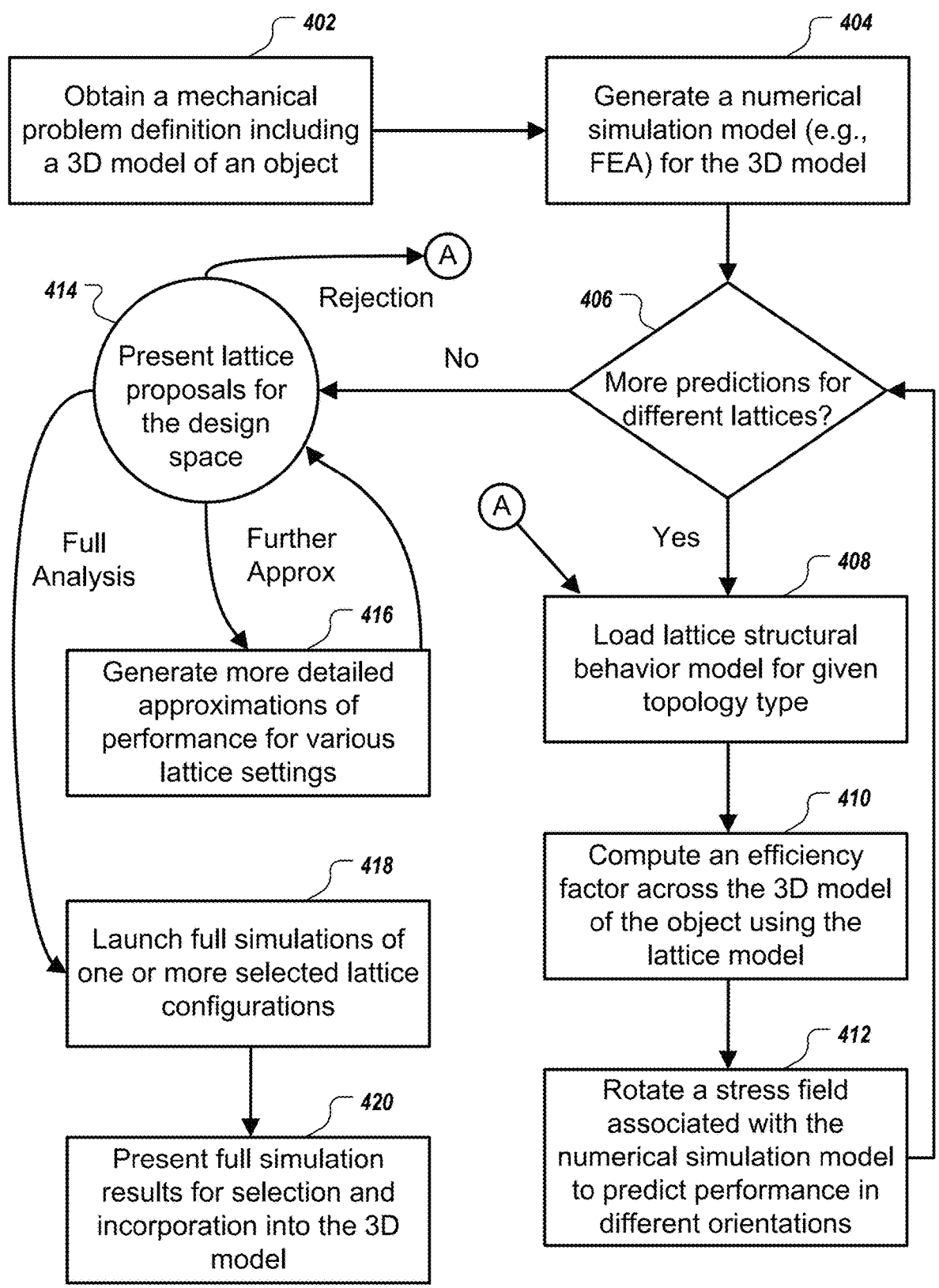
FIG. 4A shows an example of a process of predicting the performance of different lattice settings and making lattice proposals for incorporation into a three dimensional model of an object being designed.

In any case, once a database of lattice structural behavior models (e.g., a database of RVEs) has been generated (e.g., using machine learning) and is available for use, these models can be used to predict performance of various lattices settings and make recommendations during the design of a 3D model of an object to be manufactured. FIG. 4A shows an example of a process of predicting the performance of different lattice settings and making proposals for incorporation of a lattice into a three dimensional model of an object being designed. At 402, a mechanical problem definition including a 3D model of an object is obtained. The mechanical problem definition can be received from a user working with a 3D modeling program, loaded from computer storage, or both. For example, a previously designed 3D model can be loaded into memory, and then physical loading cases can be specified for the 3D model through a user interface of the 3D modeling program. Alternatively, the 3D model can be created concurrently with defining the loading cases during the design of an object using the 3D modeling program.

In general, the 3D model includes a design space in which a lattice is to be generated, and the mechanical problem definition includes one or more isotropic solid materials identified as a baseline material model for the design space and one or more loading cases for the 3D model. The isotropic solid material(s) can be specified by a user, automatically suggested by the program based on the 3D model and/or the expected manufacturing technique, or both. Further, the one or more loading cases specify one or more boundary conditions that define how forces are applied to the 3D model for each of the one or more loading cases.

At 404, a numerical simulation model is generated for the 3D model using the one or more loading cases and the one or more isotropic solid materials identified as the baseline material model for the design space. For example, the numerical simulation model can be a Finite Element Analysis (FEA) model. Other types of numerical simulation models are also possible.

The performance of different lattice settings in different orientations in the design space can be predicted using a lattice structural behavior model in place of the baseline material in the numerical simulation model. In some cases, a single lattice structural behavior model is used, such as when different volume fractions are being compared in different lattice orientations. In other cases, more than one lattice structural behavior model is used, such as when entirely different lattice topologies are being compared. Note that the different lattice settings to be compared (e.g., lattice topology, volume fraction, and isotropic solid material parameters) can be specified by a user, automatically suggested by the 3D modelling program, or both. Further, as discussed above, the different lattice structural behavior models can be RVEs that approximate structural behaviors of the different lattice topologies, volume fractions, etc., where each of the RVEs expresses the behavior of a lattice as an anisotropic solid material.

At 406, while more predictions are to be made for different lattices that can be used to fill the design space, the process continues at 408. At 408, the lattice structural behavior model for a lattice type is loaded (e.g., from an RVE database). This lattice structural behavior model can then be used to predict performance for many different potential lattice settings for the topology (e.g., lattice unit sizes and different volume fractions resulting from different beam thicknesses).

At 410, an efficiency factor for the lattice type is computed across the 3D model of the object using the loaded lattice structural behavior model. For example, strain energy can be used for comparison of different lattices. The strain energy of a lattice can be defined by $$\prod^{int}(T_i, \overline{m}_i) = \frac{1}{2} \int_\Omega \sigma(u_i) : \varepsilon(u_i) d\Omega \qquad (15)$$

where $\sigma$, $\varepsilon$ denote the stress and strain tensors, and $u_i(T_i, \overline{m}_i)$ is the displacement vector for topology type $T_i$ and other lattice design variables $m_i$. Further, in some implementations, the strain energy of Equation 15 can be predicted for each topology type using the lattice RVEs described above.

For approximation of strain energy, once the constitutive model of the lattice is known, the strain energy required to compare different topologies can be computed using solid models containing lattice RVEs. However, this still requires solving the problem for each topology type. Given that only an approximate comparison is required, a coarse resolution solid mesh can be used during computations. In situations where the surface mesh is too fine, quadric based mesh decimation (see e.g., P. Cignoni, et al., "A comparison of mesh simplification algorithms", *Computers & Graphics*, 22(1):37-54, 1998, and P. S. Heckbert et al., "Survey of polygonal surface simplification algorithms.", Technical report, Carnegie Mellon University, 1997) can be used to obtain a coarse resolution surface mesh which can then be used to generate a coarse resolution solid mesh. Note that approximating the internal energy using the stress field from a single solid computation can result in much faster lattice comparisons.

Consider a solid simulation of the given problem where the initial configuration is given by $\overline{\Omega}^s$ and the current configuration is given by $\Omega^s$ using the mapping $\Psi:\Omega^s \to \Omega^s$. Let $d\overline{\Omega}^s$ denote a solid element in the initial configuration, the stress tensor of which has the components $\sigma^T = \{\sigma_{xx}, \sigma_{yy}, \sigma_{zz}, \sigma_{yz}, \sigma_{xz}, \sigma_{xy}\}$ as shown in FIG. 4B. Following Equation 15, the internal strain energy of this element is given by $$\prod\nolimits_{\Omega_\in^s}^{int} = \frac{1}{2}\int \sigma^T \varepsilon d\Omega^s \quad (16a)$$

$$= \frac{1}{2}\int \sigma^T \hat{D}_s \sigma d\Omega^s \quad (16b)$$

where $\hat{D}_s$ is the linear elastic constitutive matrix of the solid material.

Let $d\overline{\Omega}^l$ denote the same element in the reference configuration with lattice material. Assuming the same stress field as the solid domain $\overline{\Omega}^s$, the deformed lattice element is now given by $d\Omega^l$ as shown in FIG. 4C.

Figure 4C:
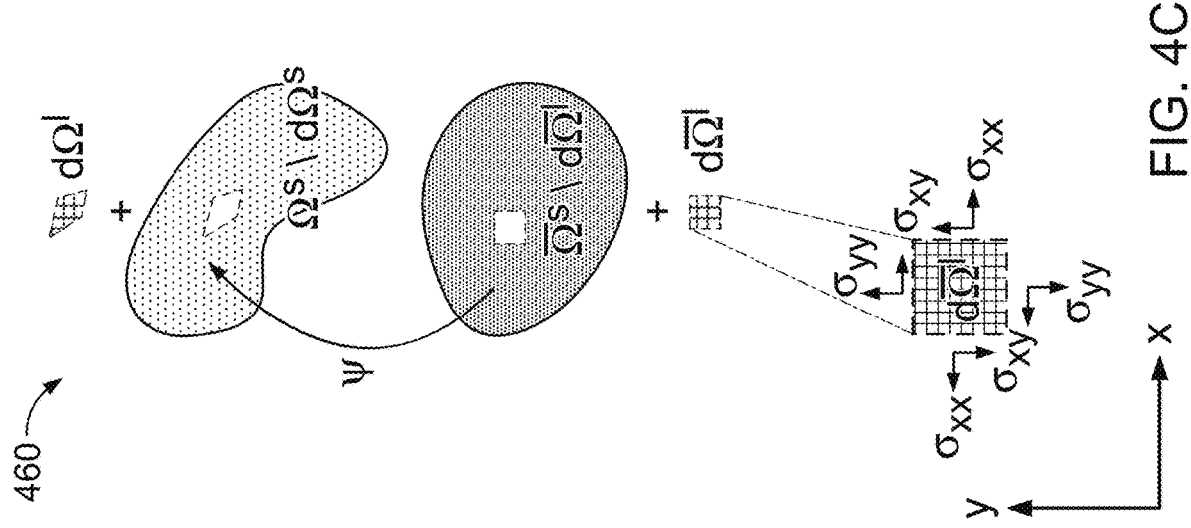
FIGS. 4B-4C show a single element with solid material replaced by lattice material.
Figure 4B:
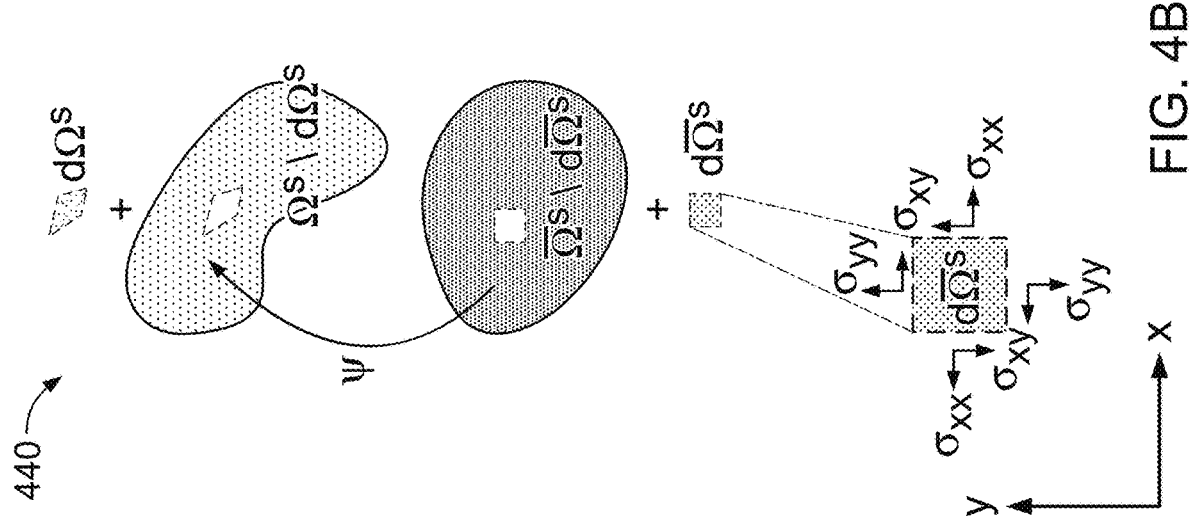

In FIGS. 4B-4C, a single element with solid material $d\overline{\Omega}^s$ is replaced by lattice material $d\overline{\Omega}^l$, where a graphical representation 440 shows the solid domain, and a graphical representation 460 shows a single solid element replaced by lattice. The same stress conditions (bottom) exist for both cases, however the deformation field (top) is no longer compatible when the lattice element is present.

The strain energy of the lattice element is $$\prod\nolimits_{\Omega_\in^l}^{int} = \frac{1}{2}\int \sigma^T \hat{D}_l \sigma d\Omega^l \quad (17)$$

where $\hat{D}_l$ is the constitutive matrix of the linear anisotropic elastic lattice material computed using the method outlined above. The internal energy of the lattice element is much higher than that of the solid element given by Equation 16, the difference in energy amounts to $$\Delta\Pi_{\Omega_\in}^{int} = \Pi_{\Omega_\in^l}^{int} - \Pi_{\Omega_\in^s}^{int} \quad (18)$$

Note that the displacement of the lattice element is not compatible with the rest of the domain, the deformation field of which still assumes that only solid material is present.

Following the same argument used to compute the strain energy change in a single element, the total increase in energy due to replacement of all solid elements with lattice is $$\Delta\prod\nolimits^{int} = \int_\Omega \Delta\prod\nolimits_{\Omega_\in}^{int} d\Omega \quad (19a)$$

$$= \frac{1}{2}\int_\Omega (\sigma^T \hat{D}_l \sigma - \sigma^T \hat{D}_s \sigma) d\Omega \quad (19b)$$

$$= \frac{1}{2}\int_\Omega \sigma^T \hat{D}\sigma d\Omega - \prod\nolimits_{\Omega^s}^{int} \quad (19c)$$

This increase in strain energy is directly related to the stiffness of each lattice and can be used as an alternative measure for comparing different lattice settings $$\Delta\Pi^{int}(T_1, \overline{m}_1) \le \Delta\Pi^{int}(T_2, \overline{m}_2) \le \ldots \quad (20)$$

When multiple load cases are present, the critical load case is used for the comparison, i.e., the load cases resulting in the maximum increase in strain energy. Effects of different lattice orientation can be included by simply rotating the Cauchy stress tensors in Equation 19.

Thus, at 412, all stress fields (each load case has a unique stress field) associated with the numerical simulation model can be rotated to predict performance of the lattice type in a different orientation. For example, let $\{e_x, e_y, e_z\}$ denote the standard Cartesian basis used to compute the lattice RVE, then the total increase in strain energy due to using a lattice in a rotated basis $\{\tilde{e}_1, \tilde{e}_2, \tilde{e}_3\}$ is given by $$\Delta\prod\nolimits^{int} = \frac{1}{2}\int_\Omega \sigma^T \hat{D}\tilde{\sigma} d\Omega - \prod\nolimits_{\Omega^s}^{int} \quad (21)$$

where $\tilde{\sigma}$ is the Cauchy stress tensor in the rotated basis given by $$\tilde{\sigma} = R\sigma R^T \quad (22)$$

with the rotation matrix R given by $$R = \begin{bmatrix} \tilde{e}_1 \cdot e_x & \tilde{e}_1 \cdot e_y & \tilde{e}_1 \cdot e_z \\ \tilde{e}_2 \cdot e_x & \tilde{e}_2 \cdot e_y & \tilde{e}_2 \cdot e_z \\ \tilde{e}_3 \cdot e_x & \tilde{e}_3 \cdot e_y & \tilde{e}_3 \cdot e_z \end{bmatrix}. \quad (23)$$

Once predictions of performance are made for different lattices, a set of lattice proposals for the design space is presented at 414 based on the predicted performance of the different lattice settings in the different orientations. In some implementations, lattices are ranked based on the approximate increase in strain energy required to replace the material of each solid element with the RVE corresponding to a lattice. Note that this involves using the stress field from the original solid simulation and the piecewise continuous strain field from the lattice to compute strain energy. Essentially, the strain field is discontinuous across elements as the numerical model is not solved again after replacing the isotropic solid material with RVEs. The advantage of not resolving the model with RVEs is the ability to give real-time lattice ranking for multiple lattice design variable types (topology, orientation, unit size, thickness) after a single solid simulation using the original material.

However, although rankings are discussed above, explicit rankings are not necessary when presenting 414 the lattice proposals. For example, in some implementations, explicit scores can be presented to help the user filter out the obvious bad choices. For example, if all the lattice proposals are rejected, the process can return to 408 for generation of further lattice predictions, which can include specification of different lattice settings to consider during the prediction process as well as refinement of the problem definition.

Further, when one or more promising lattice settings are found, these can be applied to the 3D model and additional simulation and/or optimization can then be performed. For example, lattice thicknesses can be optimized for different promising lattice settings (e.g., topology and orientation proposals) and then further comparisons can be performed. Note that this additional processing can be done automatically in an extension that runs simulations and/or optimization on the promising lattice types and then compares the actual efficiencies only on those. In some implementations, user input is sought along the way.

For example, after the initial presentation of lattice proposals, a user can be allowed to select two or more options on which to run further, more detailed analyses. At 416, in response to such further approximation input, more detailed approximations of performance can be generated for various lattice settings before a new set of lattice proposals are presented at 414. Note that in a multi-objective design/optimization problem, many solutions may be interesting or promising for the user from different aspects, while in a single objective situation, usually one of the solutions can be labelled as the best (given the error margins and accuracy of approximation).

In addition, a full analysis can be requested for a selected subset (one or more) of the presented lattice proposals. For example, a user can select one or more different lattice configurations shown in a list of different lattice configurations presented in a user interface of a 3D modeling program. In response, actual (full) simulations of the selected one or more of the different lattice configurations can be launched at 418 for detailed study and optimization, and results of full simulation can be presented at 420 for selection and incorporation into the 3D model.

Note that various different workflows are possible for the lattice recommender. For example, in some implementations, the workflows can include one or more of the following options:

1. Quick lattice recommender using single solid simulation: A single solid simulation is done using the baseline isotropic solid material. The performance of different lattice settings and orientations is done by swapping the isotropic solid material with RVE for lattice and measuring the approximate increase in strain energy required to replace the material of each solid element with structural behavior model of each respective lattice.

2. Quick lattice recommender using multiple solid simulations: Multiple solid simulations are done using anisotropic solid material properties. Note that a coarse solid mesh should be used for this simulation. The anisotropic solid material property is obtained using RVE for lattice corresponding to the lattice settings and orientation to be compared. Complex multi-physics simulations (e.g., thermal, natural frequency, buckling) can be setup to provide the simulation output quality (e.g., strain energy, Von Mises stress, displacement, temperature, vibration frequency, buckling safety factor) which is to be used for comparison between different lattice settings and orientations.

3. Actual lattice comparison: The actual lattice geometry is created and multiple lattice simulations are done with beam and shell elements representing the lattice and skin respectively. The actual baseline isotropic solid material is used as the material for these beam and shell elements, there is no lattice RVE in use. Complex multi-physics simulations (e.g., thermal, natural frequency, buckling) can be setup to provide the simulation output quality (e.g., strain energy, Von Mises stress, displacement, temperature, vibration frequency, buckling safety factor) which is to be used for comparison between different lattice settings and orientations.

4. Verification lattice comparison: The actual lattice geometry is created and multiple lattice simulations are done with fine resolution solid elements representing the lattice and skin. The actual baseline isotropic solid material is used as the material for these beam and shell elements, there is no lattice RVE in use. Complex multi-physics simulations (e.g., thermal, natural frequency, buckling) can be setup to provide the simulation output quality (e.g., strain energy, Von Mises stress, displacement, temperature, vibration frequency, buckling safety factor) which is to be used for comparison between different lattice settings and orientations.

Figure 5:
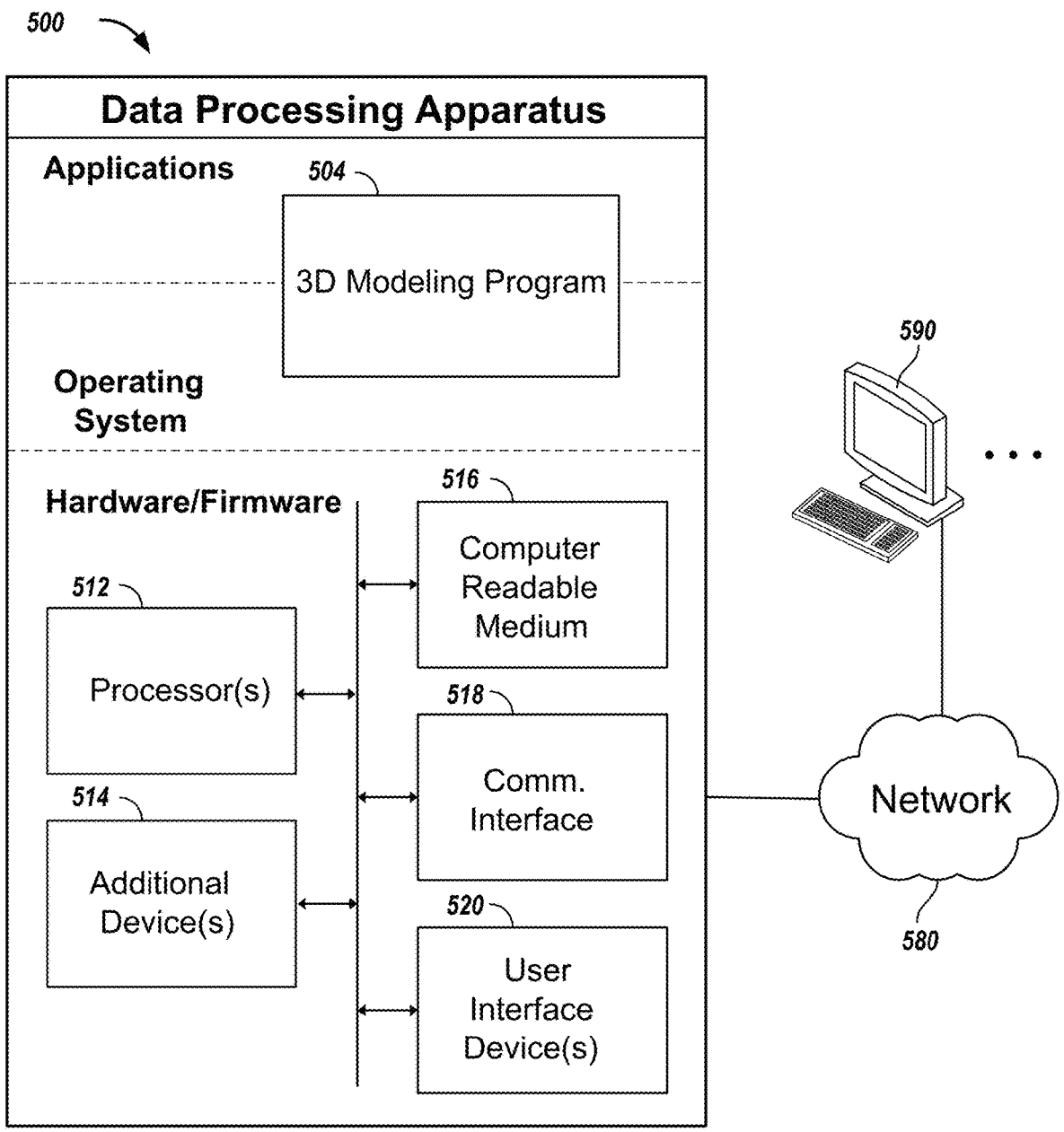
FIG. 5 is a schematic diagram of a data processing system.

FIG. 5 is a schematic diagram of a data processing system including a data processing apparatus 500, which can be programmed as a client or as a server. The data processing apparatus 500 is connected with one or more computers 590 through a network 580. While only one computer is shown in FIG. 5 as the data processing apparatus 500, multiple computers can be used. The data processing apparatus 500 includes various software modules, which can be distributed between an applications layer and an operating system. These can include executable and/or interpretable software programs or libraries, including tools and services of a 3D modeling program 504, such as described above. The number of software modules used can vary from one implementation to another. Moreover, the software modules can be distributed on one or more data processing apparatus connected by one or more computer networks or other suitable communication networks.

In some implementations, the 3D modeling program 504 can make lattice recommendations based on changing lattice topology type while keeping either unit size or beam thickness constant, and other parameters can be adjusted automatically such that lattice volume is kept constant. In some implementations, the user can select a unit size, after which the 3D modeling program 504 can automatically compute the thickness for different topology types such that total lattice volume is kept constant. In some implementations, a framework is created for approximating lattices as linear anisotropic elastic materials using RVEs. This can also be used for simulation and optimization of lattices using solid elements. Such solid simulations can be performed much faster than when using beams elements, enabling large design problems to be handled using less resources.

In addition, a numerical test model can be made available in the 3D modeling program 504, and solving the numerical test model can generate the D for the lattice in use. This can be used for generating the RVE for any lattice topology types in the 3D modeling program 504. Note that users can be allowed to add custom topologies to this model to obtain RVEs for such topologies. Moreover, strain energy can be used by the 3D modeling program 504 as a measure of comparing lattice topology types in the data processing apparatus 500.

The data processing apparatus 500 also includes hardware or firmware devices including one or more processors 512, one or more additional devices 514, a computer readable medium 516, a communication interface 518, and one or more user interface devices 520. Each processor 512 is capable of processing instructions for execution within the data processing apparatus 500. In some implementations, the processor 512 is a single or multi-threaded processor. Each processor 512 is capable of processing instructions stored on the computer readable medium 516 or on a storage device such as one of the additional devices 514. The data processing apparatus 500 uses its communication interface 518 to communicate with one or more computers 590, for example, over a network 580. Thus, in various implementations, the processes described can be run in parallel or serially, on a single or multi-core computing machine, and/or on a cluster/cloud, etc.

Examples of user interface devices 520 include a display, a camera, a speaker, a microphone, a tactile feedback device, a keyboard, and a mouse. The data processing apparatus 500 can store instructions that implement operations associated with the modules described above, for example, on the computer readable medium 516 or one or more additional devices 514, for example, one or more of a floppy disk device, a hard disk device, an optical disk device, a tape device, and a solid state memory device.

Several examples are now provided to validate the topology comparison method outlined above. A solid simulation was initially performed after which the topology comparison was predicted using Equation 20. This was next compared with the actual strain energy ratios as in Equation 3 obtained by simulating numerical models containing the lattice. The material Nickel Alloy IN718 for EOSIN™ 270 (Young's modulus 170000 MPa, Poisson's ratio 0.29) is used in all the following examples.

Figure 6A:
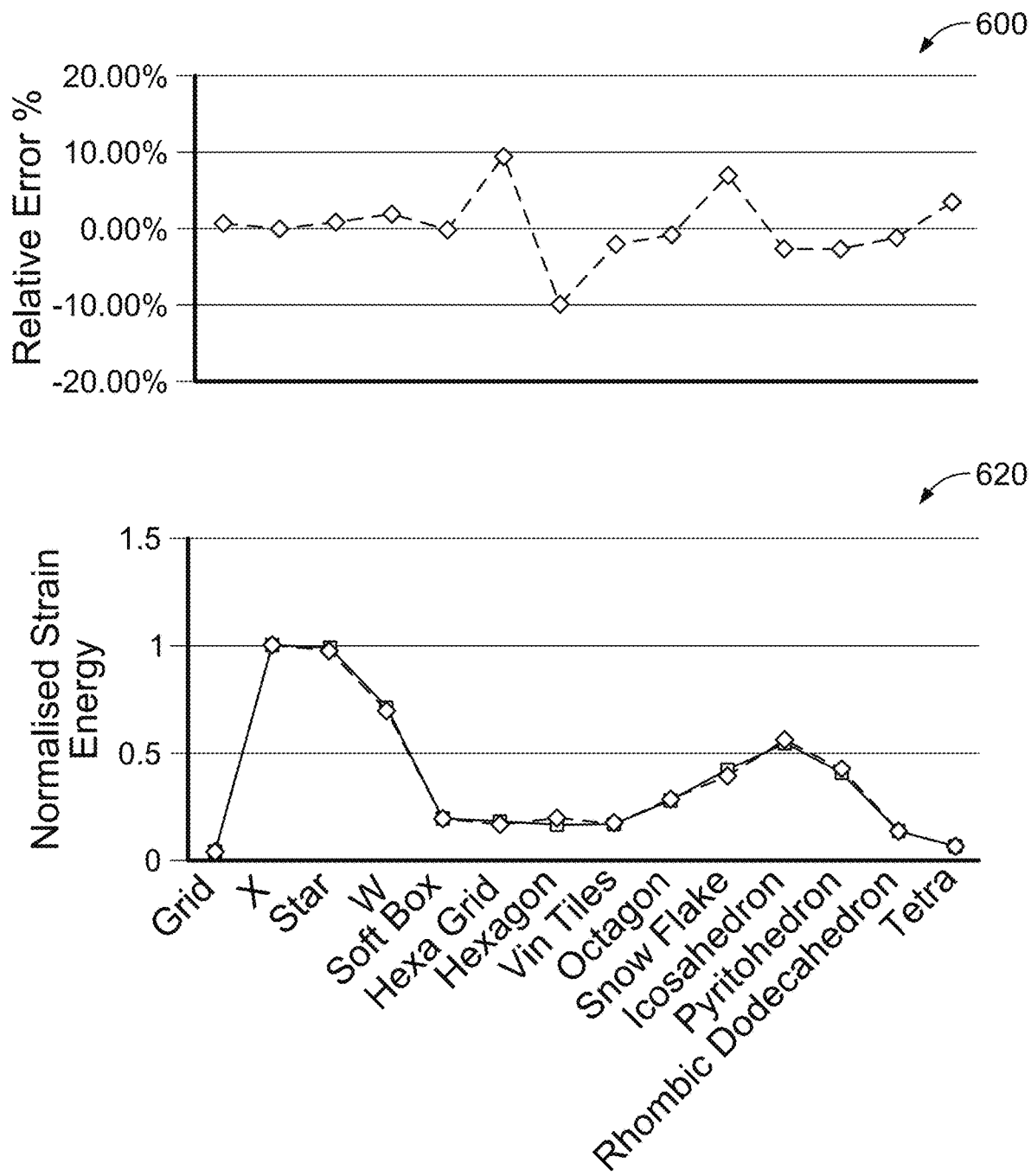
FIG. 6A shows topology comparison for a unit stress loading example.

Unit stress loading: The unit stress applications performed to compute the lattice $\hat{D}$ matrices can be used as verification examples. The comparison for the $\sigma_{xx}=1$ case is shown in FIG. 6A where an axially loaded cylinder of diameter 25 mm and height 100 mm is discretized with 2500 elements. Topologies are compared with a unit size ratio of $u^3/(\bar{f}_v V)$ =0.002 for all topologies except for Hexa Grid. The latter uses $u^3/\bar{f}_v V=0.0002$ due to the large size of the repetitive pattern in this topology. FIG. 6A shows topology comparison for unit stress loading example with $\sigma_{xx}=1$ MPa. Chart 620 in FIG. 6A shows the actual normalized strain energies and the predictions. As shown, the predicted values closely match the actual values. The relative errors between the actual and predicted values are shown in chart 600.

In a shaft load on connector example, the problem consists of a connector of bounding box dimensions 20×79×59 mm. The model is discretized with 29500 elements and a horizontal pressure load of magnitude 1 MPa applied on part of the inner shaft 640 as shown in FIG. 6B. The actual strain energy is computed using a lattice component 645 as shown in FIG. 6C (in this example, using X lattice topology). The comparison between prediction and actual values are shown in FIG. 6D. Chart 680 in FIG. 6D shows the actual normalized strain energies and the predictions. The relative error between the actual and predicted values are shown in chart 660.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, the actions recited in the claims can be performed in a different order and still achieve desirable results.

What is claimed is:

1. A method comprising:
performing, by a three dimensional modeling program, a numerical simulation of a three dimensional model of an object to be manufactured using a specified isotropic solid material;
computing, by the three dimensional modeling program, changes in internal energy for the three dimensional model of the object using results of the numerical simulation with solid elements of the specified isotropic solid material used in the numerical simulation being replaced by representative volume elements that approximate lattice behavior for different lattice design variables comprising at least lattice orientation;
presenting, by the three dimensional modeling program, a set of lattice proposals for the three dimensional model of the object based on the changes in the internal energy;
receiving, by the three dimensional modeling program, input selecting a lattice from the set of lattice proposals; and
incorporating, by the three dimensional modeling program, the selected lattice into the three dimensional model.

2. The method of claim 1, wherein computing the changes in internal energy comprises replacing the solid elements of the specified isotropic solid material used in the numerical simulation with representative volume elements that express behavior of a lattice as an anisotropic solid material.

3. The method of claim 2, wherein the different lattice design variables comprise lattice topology and at least two variables selected from unit size, thickness, and volume fraction.

4. The method of claim 2, wherein computing the changes in internal energy comprises computing changes in thermal energy or electric potential energy for the three dimensional model of the object.

5. The method of claim 1, wherein computing the changes in internal energy comprises computing changes in strain energy for the three dimensional model of the object.

6. The method of claim 5, wherein computing the changes in strain energy comprises using a stress field from the numerical simulation and a piecewise continuous strain field for each of two or more different lattices.

7. The method of claim 6, wherein the stress field from the numerical simulation is one or more stress fields corresponding to one or more respective load cases provided for the numerical simulation, and computing the changes in strain energy comprises rotating each of the one or more stress fields to predict performance of a lattice type in different orientations.

8. The method of claim 7, wherein presenting the set of lattice proposals for the three dimensional model comprises ranking the lattice proposals by strain energy increase.

9. The method of claim 1, wherein the specified isotropic solid material is suggested by the three dimensional modeling program based on the three dimensional model of the object, a manufacturing technique to be used to manufacture the object, or both.

10. The method of claim 1, comprising:
performing, by the three dimensional modeling program, a full simulation of the selected lattice incorporated into the three dimensional model.

11. A system comprising:
a non-transitory storage medium having instructions of a three dimensional modeling program stored thereon; and
one or more data processing apparatus configured to run the instructions of the three dimensional modeling program to cause the one or more data processing apparatus to
perform a numerical simulation of a three dimensional model of an object to be manufactured using a specified isotropic solid material,
compute changes in internal energy for the three dimensional model of the object using results of the numerical simulation with solid elements of the specified isotropic solid material used in the numerical simulation being replaced by representative volume elements that approximate lattice behavior for different lattice design variables comprising at least lattice orientation,
present a set of lattice proposals for the three dimensional model of the object based on the changes in the internal energy,
receive input selecting a lattice from the set of lattice proposals, and
incorporate the selected lattice into the three dimensional model.

12. The system of claim 11, wherein the one or more data processing apparatus are configured to run the instructions to cause computation of the changes in internal energy by being configured to replace the solid elements of the specified isotropic solid material used in the numerical simulation with representative volume elements that express behavior of a lattice as an anisotropic solid material.

13. The system of claim 12, wherein the different lattice design variables comprise lattice topology and at least two variables selected from unit size, thickness, and volume fraction.

14. The system of claim 12, wherein the one or more data processing apparatus are configured to run the instructions to cause computation of the changes in internal energy by being configured to compute changes in thermal energy or electric potential energy for the three dimensional model of the object.

15. The system of claim 11, wherein the one or more data processing apparatus are configured to run the instructions to cause computation of the changes in internal energy by being configured to compute changes in strain energy for the three dimensional model of the object.

16. The system of claim 15, wherein the one or more data processing apparatus are configured to run the instructions to cause computation of the changes in strain energy by being configured to use a stress field from the numerical simulation and a piecewise continuous strain field for each of two or more different lattices.

17. The system of claim 16, wherein the stress field from the numerical simulation is one or more stress fields corresponding to one or more respective load cases provided for the numerical simulation, and the one or more data processing apparatus are configured to run the instructions to cause computation of the changes in strain energy by being configured to rotate each of the one or more stress fields to predict performance of a lattice type in different orientations.

18. The system of claim 17, wherein the one or more data processing apparatus are configured to run the instructions to cause presentation of the set of lattice proposals for the three dimensional model by being configured to rank the lattice proposals by strain energy increase.

19. The system of claim 11, wherein the one or more data processing apparatus are configured to run the instructions to cause the one or more data processing apparatus to suggest the specified isotropic solid material based on the three dimensional model of the object, a manufacturing technique to be used to manufacture the object, or both.

20. The system of claim 11, wherein the one or more data processing apparatus are configured to run the instructions to cause the one or more data processing apparatus to perform a full simulation of the selected lattice incorporated into the three dimensional model.

\* \* \* \* \*